United States Patent
Kikuchi

(10) Patent No.: US 10,040,017 B2
(45) Date of Patent: Aug. 7, 2018

(54) PLUGGED HONEYCOMB STRUCTURE

(71) Applicant: NGK INSULATORS, LTD., Nagoya (JP)

(72) Inventor: Yoshio Kikuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 58 days.

(21) Appl. No.: 15/070,372

(22) Filed: Mar. 15, 2016

(65) Prior Publication Data
US 2016/0271549 A1 Sep. 22, 2016

(30) Foreign Application Priority Data
Mar. 20, 2015 (JP) .................. 2015-058567

(51) Int. Cl.
*B01D 50/00* (2006.01)
*B01D 39/06* (2006.01)
(Continued)

(52) U.S. Cl.
CPC ..... *B01D 46/2459* (2013.01); *B01D 46/2429* (2013.01); *B01D 46/2474* (2013.01); *C04B 35/195* (2013.01); *C04B 35/66* (2013.01); *C04B 38/0006* (2013.01); *C04B 38/0009* (2013.01); *F01N 3/0222* (2013.01); *F01N 3/035* (2013.01);
(Continued)

(58) Field of Classification Search
CPC ............ B01D 46/2459; B01D 46/2429; B01D 46/2474; C04B 35/195; C04B 35/66; C04B 38/0006; C04B 38/0009; F01N 3/0222; F01N 3/035
See application file for complete search history.

(56) References Cited

U.S. PATENT DOCUMENTS 4,719,058 A 1/1988 Komoda
6,479,099 B1 11/2002 Takahashi et al.
(Continued)

FOREIGN PATENT DOCUMENTS

EP 1 842 578 A2 10/2007
EP 2 158 956 A1 3/2010
(Continued)

OTHER PUBLICATIONS

Extended European Search Report (Application No. 16161130.6) dated Jul. 22, 2016.
(Continued)

*Primary Examiner* — Amber R Orlando
(74) *Attorney, Agent, or Firm* — Burr & Brown, PLLC

(57) ABSTRACT

A plugged honeycomb structure includes: a pillar-shaped honeycomb substrate having a partition wall base material that defines a plurality of cells serving as a through channel of fluid; a plugging portion disposed at open ends of predetermined cells at an inflow-side end face of fluid and at open ends of residual cells at an outflow-side end face of fluid; and a porous trapping layer disposed at least at a surface of the partition wall base material of the residual cells. The partition wall base material is formed by a base material porous body including cordierite as a main phase, the trapping layer is formed by a trapping layer porous body including cordierite as a main phase, and a part of the trapping layer penetrating into pores formed at the partition wall base material has a thickness of 0 to 20 μm.

12 Claims, 6 Drawing Sheets

(51) Int. Cl.

| | | |
|---|---|---|
| *B01D 39/14* | (2006.01) | |
| *B01D 39/20* | (2006.01) | |
| *B01D 46/24* | (2006.01) | |
| *C04B 35/195* | (2006.01) | |
| *C04B 38/00* | (2006.01) | |
| *C04B 35/66* | (2006.01) | |
| *F01N 3/022* | (2006.01) | |
| *F01N 3/035* | (2006.01) | |
| *C04B 111/00* | (2006.01) | |
| *C04B 111/34* | (2006.01) | |

(52) U.S. Cl.
CPC ........ *B01D 2046/2433* (2013.01); *B01D 2046/2437* (2013.01); *B01D 2046/2481* (2013.01); *B01D 2279/30* (2013.01); *C04B 2111/0081* (2013.01); *C04B 2111/00793* (2013.01); *C04B 2111/343* (2013.01); *C04B 2235/3206* (2013.01); *C04B 2235/3217* (2013.01); *C04B 2235/3225* (2013.01); *C04B 2235/3229* (2013.01); *C04B 2235/3232* (2013.01); *C04B 2235/3244* (2013.01); *C04B 2235/3418* (2013.01); *C04B 2235/3445* (2013.01); *C04B 2235/3481* (2013.01); *F01N 2330/30* (2013.01)

(56) References Cited

U.S. PATENT DOCUMENTS

| | | | |
|---|---|---|---|
| 6,509,060 B1 | 1/2003 | Komoda et al. | |
| 8,897,549 B2 | 11/2014 | Sakashita et al. | |
| 9,273,574 B2* | 3/2016 | Tanaka | ........... F01N 3/0222 |
| 2007/0234694 A1 | 10/2007 | Miyairi et al. | |
| 2010/0135866 A1 | 6/2010 | Mizuno et al. | |
| 2012/0240538 A1* | 9/2012 | Isoda | ........... B01D 46/2429 55/486 |
| 2012/0240542 A1* | 9/2012 | Kikuchi | ........... B28B 11/006 55/523 |
| 2012/0317946 A1 | 12/2012 | Miyairi | |
| 2013/0336578 A1* | 12/2013 | Sakashita | ........... C04B 38/00 382/154 |
| 2015/0260067 A1* | 9/2015 | Kikuchi | ........... B01D 46/0001 422/177 |
| 2016/0068441 A1* | 3/2016 | Backhaus-Ricoult | ........... C04B 35/1015 55/523 |

FOREIGN PATENT DOCUMENTS

| | | |
|---|---|---|
| EP | 2 918 566 A1 | 9/2015 |
| JP | 63-66566 | 12/1988 |
| JP | 1-274815 | 11/1989 |
| JP | 2000-288324 | 10/2000 |
| JP | 5426803 | 2/2014 |

OTHER PUBLICATIONS

U.S. Appl. No. 15/070,409, filed Mar. 15, 2016, Kikuchi et al.
Mizuno et al., "*Study on Wall Pore Structure for Next Generation Diesel Particulate Filter*," SAE Technical Paper 2008-01-0618, Society of Automotive Engineers (2008), p. 289-298.

* cited by examiner

VOLUME RATIO (CC/CC) OF VIRTUAL CURVED SURFACE SOLID ACCOUNTING FOR IN VOLUME OF SPACE PIXEL

EQUIVALENT DIAMETER (μm)

PLUGGED HONEYCOMB STRUCTURE

The present application is an application based on JP 2015-058567 filed on Mar. 20, 2015 with Japan Patent Office, the entire contents of which are incorporated herein by reference.

BACKGROUND OF THE INVENTION

Field of the Invention

The present invention relates to plugged honeycomb structures. More particularly the present invention relates to a plugged honeycomb structure with high heat capacity, low initial pressure loss, small increase in pressure loss during the deposition of particulate matter, and high trapping efficiency of particulate matter.

Description of the Related Art

A plugged honeycomb structure is widely used as a honeycomb filter to trap particulate matter included in dust containing fluid, such as exhaust gas emitted from a diesel engine, or as a catalyst carrier to load catalyst for purification of harmful substance (e.g., NOx) in exhaust gas.

When a plugged honeycomb structure is used as a honeycomb filter, the honeycomb filter has to be regenerated by combusting particulate matter deposited at the honeycomb filter for removal on a regular basis. However, if a honeycomb filter is regenerated frequently, the fuel consumption thereof deteriorates, and so the regeneration frequency of a honeycomb filter has to be reduced. To reduce the regeneration frequency of a honeycomb filter, the amount of particulate matter to be combusted for removal at one time has to be increased. Meanwhile, if a large amount of particulate matter is combusted for removal at one time, internal temperature of the honeycomb filter rises, and the honeycomb filter may break. Then, there is a method of lowering the porosity of the partition wall of a honeycomb filter to increase the heat capacity of the honeycomb filter, and so an increase in the temperature of the inside of the honeycomb filter is suppressed even when a large amount of particulate matter is combusted for removal at one time. When the partition wall of a honeycomb filter has lowered porosity to increase the heat capacity of the honeycomb filter, however, increase in pressure loss during deposition of particulate matter increases, and the fuel consumption of an engine or the like may deteriorate.

In order to suppress such increase in pressure loss during deposition of particulate matter, there is proposed a filter that includes a trapping layer to trap particulate matter at the surface of the partition wall of the honeycomb filter to suppress penetration of particulate matter into the partition wall (e.g., see Non Patent Document 1).

According to a conventional method for manufacturing a honeycomb structure including a trapping layer, slurry to form the trapping layer (trapping-layer forming raw material) is applied to the porous partition wall (partition wall base material), followed by firing to form the trapping layer. Examples of the method for applying slurry to form the trapping layer includes immersion of a honeycomb structure in the slurry to form the trapping layer (trapping-layer forming raw material) or pouring the slurry to form the trapping layer into cells of the honeycomb structure. Then, when a porous membrane having a pore diameter smaller than that of the partition wall and having thickness thinner than that of the partition wall is formed at the surface of the porous partition wall, ceramic particles making up the porous membrane have to have a particle diameter that is smaller than the pore diameter of the partition wall. The thus obtained honeycomb structure, however, has a problem that the slurry to form the trapping layer penetrates into pores of the partition wall (partition wall base material) of the honeycomb structure, and so initial pressure loss when letting exhaust gas pass through the obtained honeycomb structure increases.

Meanwhile there is another honeycomb structure that is prepared by filling pores of a porous supporting member with "substance capable of being removed later" to block these pores, followed by application of slurry including ceramic particles with a small particle diameter to the surface of the porous supporting member (e.g., see Patent Documents 1 to 3). Such "substance capable of being removed later" includes combustible substance (Patent Document 1), for example. When combustible substance is used, such combustible substance can be combusted for removal through a firing step performed later. Examples of the "substance capable of being removed later" include water and alcohol (Patent Documents 2 and 3). When water or alcohol is used, drying is performed after the application of slurry, whereby such water or alcohol can be removed.

[Patent Document 1] JP-A-H01-274815
[Patent Document 2] JP-B-S63-66566
[Patent Document 3] JP-A-2000-288324
[Non Patent Document 1] SAE Technical Paper 2008-01-0618, Society of Automotive Engineers (2008)

SUMMARY OF THE INVENTION

According to the manufacturing methods described in Patent Documents 1 to 3 as stated above, they can suppress penetration of slurry to form a trapping layer into the pores of the porous supporting member (partition wall), but it is difficult to suppress the penetration sufficiently. Therefore, the obtained honeycomb structure has still high initial pressure loss when exhaust gas passes through the honeycomb structure. Further, the honeycomb structure cannot have sufficiently high heat capacity.

In view of such problems, the present invention aims to provide a plugged honeycomb structure with high heat capacity, low initial pressure loss, small increase in pressure loss during the deposition of particulate matter, and high trapping efficiency of particulate matter.

According to a first aspect of the present invention, a plugged honeycomb structure includes: a pillar-shaped honeycomb substrate having a partition wall base material that defines a plurality of cells serving as a through channel of fluid is provided; a plugging portion disposed at open ends of predetermined cells at an inflow-side end face of fluid and at open ends of residual cells at an outflow-side end face of fluid; and a porous trapping layer disposed at least at a part of a surface of the partition wall base material, wherein the partition wall base material is formed by a base material porous body including cordierite as a main phase, the trapping layer is formed by a trapping layer porous body including cordierite as a main phase, the trapping layer is disposed at least at a surface of the partition wall base material of the residual cells, and a part of the trapping layer penetrating into pores formed at the partition wall base material has a thickness of 0 to 20 µm.

According to a second aspect of the present invention, the plugged honeycomb structure according to the first aspect is provided, wherein the partition wall base material has a thickness of 100 to 500 µm.

According to a third aspect of the present invention, the plugged honeycomb structure according to the first or second aspects is provided, wherein the partition wall base material has porosity of 30 to 50%.

According to a fourth aspect of the present invention, the plugged honeycomb structure according to any one of the first to third aspects is provided, wherein the partition wall base material has an average in-plane uniformity index γ of 0.7 or more.

According to a fifth aspect of the present invention, the plugged honeycomb structure according to any one of the first to fourth aspects is provided, wherein the partition wall base material has an average pore diameter of 10 to 40 μm.

According to a sixth aspect of the present invention, the plugged honeycomb structure according to any one of the first to fifth aspects is provided, wherein the base material porous body forming the partition wall base material includes, as sintering aid, at least one type selected from the group consisting of $ZrO_2$, $TiO_2$, $CeO_2$, and $Y_2O_3$.

According to a seventh aspect of the present invention, the plugged honeycomb structure according to the sixth aspect is provided, wherein the base material porous body forming the partition wall base material includes 1 to 5 parts by mass of the sintering aid with respect to total mass of MgO, $Al_2O_3$, and $SiO_2$ that is 100 parts by mass.

According to an eighth aspect of the present invention, the plugged honeycomb structure according to any one of the first to seventh aspects is provided, wherein the trapping layer has a pore surface area per unit volume that is twice or more of a pore surface area per unit volume of the partition wall base material.

According to a ninth aspect of the present invention, the plugged honeycomb structure according to any one of the first to eighth aspects is provided, wherein the trapping layer has a pore surface area per unit volume that is 0.05 to 0.3 $μm^{-1}$.

According to a tenth aspect of the present invention, the plugged honeycomb structure according to any one of the first to ninth aspects is provided, wherein the trapping layer has porosity of 40 to 80%.

According to an eleventh aspect of the present invention, the plugged honeycomb structure according to any one of the first to tenth aspects is provided, wherein the trapping layer has an average pore diameter of 1 to 3 μm.

According to a twelfth aspect of the present invention, the plugged honeycomb structure according to any one of the first to eleventh aspects is provided, wherein the trapping layer has an average thickness of 10 to 50 μm.

According to a thirteenth aspect of the present invention, the plugged honeycomb structure according to any one of the first to twelfth aspects is provided, wherein the trapping layer has standard deviation of thickness that is 10 μm or less.

A plugged honeycomb structure of the present invention includes: a pillar-shaped honeycomb substrate; a plugging portion; and a porous trapping layer. The honeycomb substrate has a partition wall base material that defines a plurality of cells serving as a through channel of fluid. The plugging portion is disposed at open ends of predetermined cells at an inflow-side end face of fluid and at open ends of residual cells at an outflow-side end face of fluid. The trapping layer is disposed at least at a part of a surface of the partition wall base material, and is disposed at least at the surface of the partition wall base material of the residual cells. Then, in the plugged honeycomb structure of the present invention, the partition wall base material of the honeycomb substrate is formed by a base material porous body including cordierite as a main phase, and the trapping layer of the honeycomb substrate is formed by a trapping layer porous body including cordierite as a main phase. In the plugged honeycomb structure of the present invention, a part of the trapping layer penetrating into pores formed at the partition wall base material has a thickness of 0 to 20 μm. That is, in the plugged honeycomb structure of the present invention, the trapping layer does not penetrate into the pores formed at the partition wall base material, or a part of the trapping layer penetrates into the pores formed at the partition wall base material and the part of the trapping layer penetrating into the pores formed at the partition wall base material has a thickness of 20 μm or less. The plugged honeycomb structure of the present invention includes the trapping layer of the aforementioned structure at the surface of the partition wall base material of the honeycomb substrate, and therefore when it is used as a honeycomb filter, the filter can have high performance of trapping particulate matter and can suppress increase in pressure loss during deposition of particulate matter. Further, both the partition wall base material and the trapping layer of the plugged honeycomb structure of the present invention are formed by a porous body including cordierite as a main phase, and therefore the plugged honeycomb structure has excellent thermal shock resistance. Moreover, the plugged honeycomb structure of the present invention is configured so that the a part of the trapping layer that penetrates into the pores formed at the partition wall base material has a thickness of 0 to 20 μm, and therefore when it is used as a honeycomb filter, the filter has low initial pressure loss. Hereinafter "the thickness of the part of the trapping layer penetrating into the pores formed at the partition wall base material may be called a "penetrating depth of the trapping layer".

DESCRIPTION OF THE PREFERRED EMBODIMENTS

Figure 1:
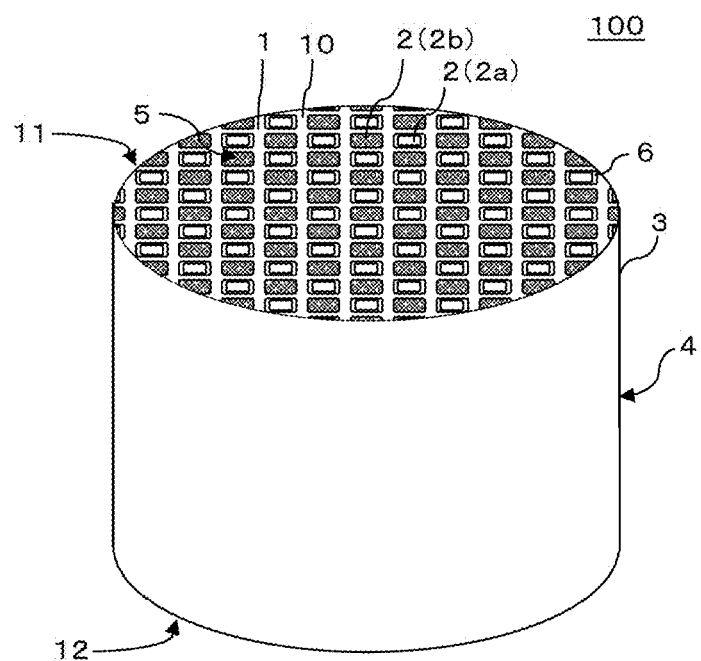
FIG. 1 is a schematic perspective view of one embodiment of a plugged honeycomb structure of the present invention from its inflow-side end face.

The following describes embodiments of the present invention specifically, with reference to the drawings. The present invention is not limited to the following embodiments, and is to be understood to include the following embodiments, to which modifications and improvements are added as needed based on the ordinary knowledge of a person skilled in the art without departing from the scope of the present invention.

(1) Plugged Honeycomb Structure:

One embodiment of a plugged honeycomb structure of the present invention is a plugged honeycomb structure 100 including a pillar-shaped honeycomb substrate 4, a plugging portion 5 disposed at open ends of cells 2 and a trapping layer 6 disposed at least at a part of the surface of a partition wall base material 1 as shown in FIGS. 1 to 5. The honeycomb substrate 4 has the partition wall base material 1 that defines a plurality of cells 2 serving as a through channel of fluid, and extending from an inflow-side end face 11 to an outflow-side end face 12. Hereinafter in the present specification, an element including the porous partition wall base material 1 and the porous trapping layer 6 disposed at the surface of the partition wall base material 1 may be called a partition wall 10. The plugging portion 5 is disposed at open ends on one side of the plurality of cells 2 to plug the open ends of the cells 2. In FIGS. 1 to 5, the plugging portion 5 is disposed at predetermined cells 2b (hereinafter they may be called simply "cells 2b" as well) at the inflow-side end face 11, and at residual cells 2a (hereinafter they may be called simply "cells 2a" as well) at the outflow-side end face 12. Then, the trapping layer 6 is disposed at least at the surface of the partition wall base material of the residual cells 2a. The thus configured plugged honeycomb structure 100 can be used as a honeycomb filter to purify exhaust gas emitted from an internal combustion engine or a various type of combustion device. The plugged honeycomb structure 100 shown in FIGS. 1 to 5 further has a circumferential wall 3 located at the outermost circumference of the honeycomb substrate 4.

Figure 2:
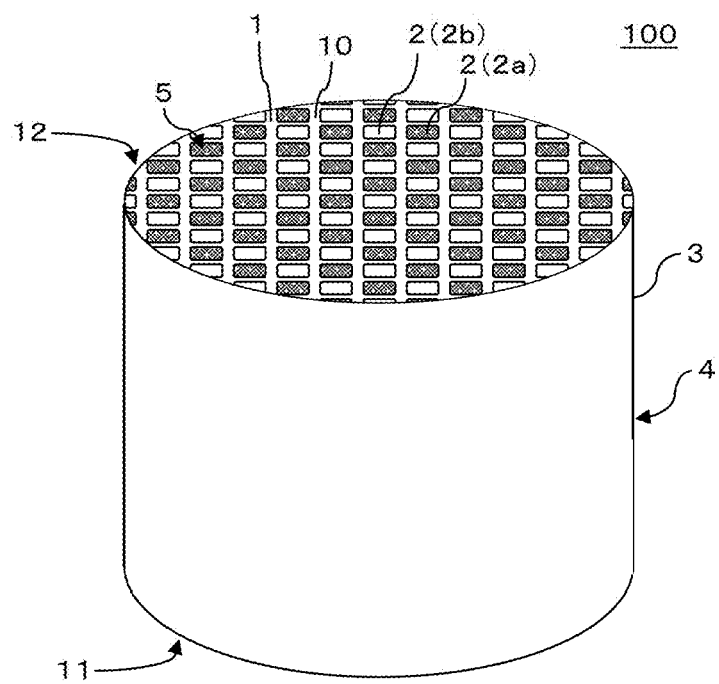
FIG. 2 is a schematic perspective view of the plugged honeycomb structure shown in FIG. 1 from its outflow-side end face.
Figure 3:
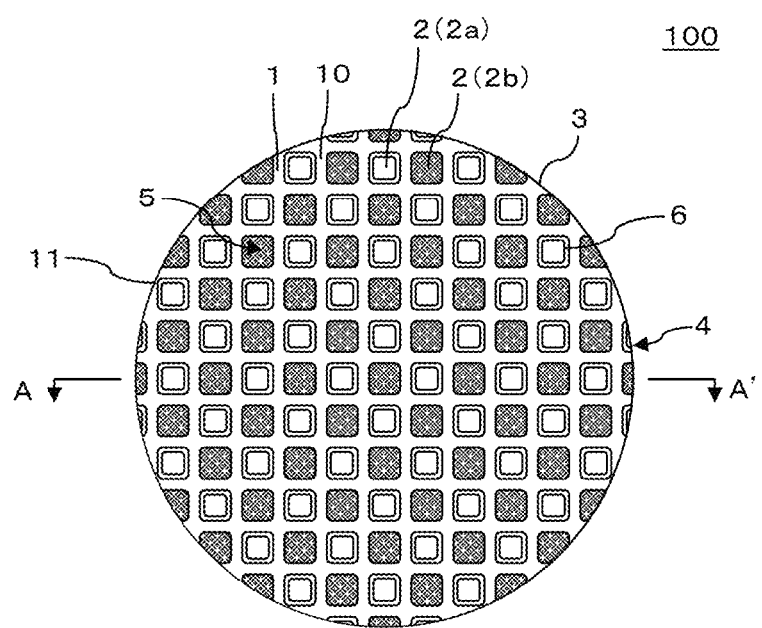
FIG. 3 is a schematic plan view of the plugged honeycomb structure shown in FIG. 1 from the inflow-side end face.
Figure 4:
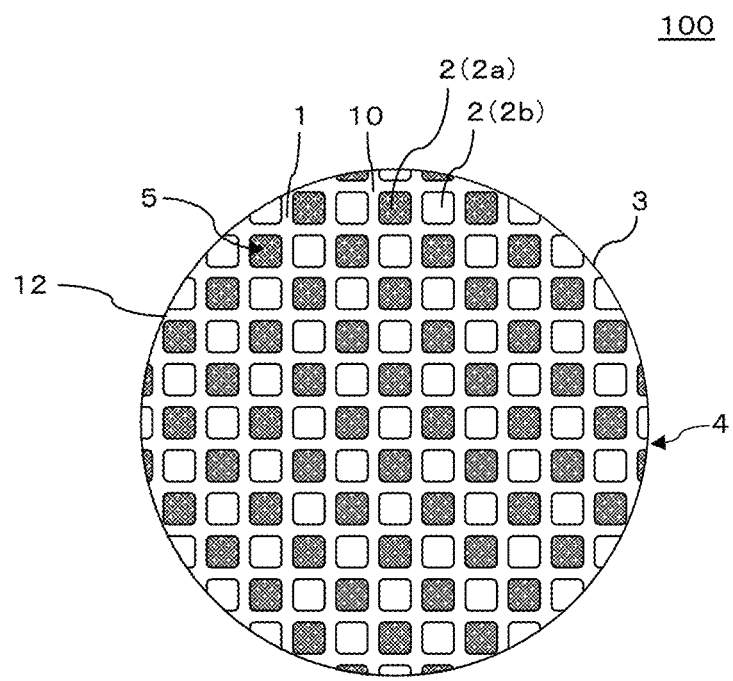
FIG. 4 is a schematic plan view of the plugged honeycomb structure shown in FIG. 1 from the outflow-side end face.
Figure 5:
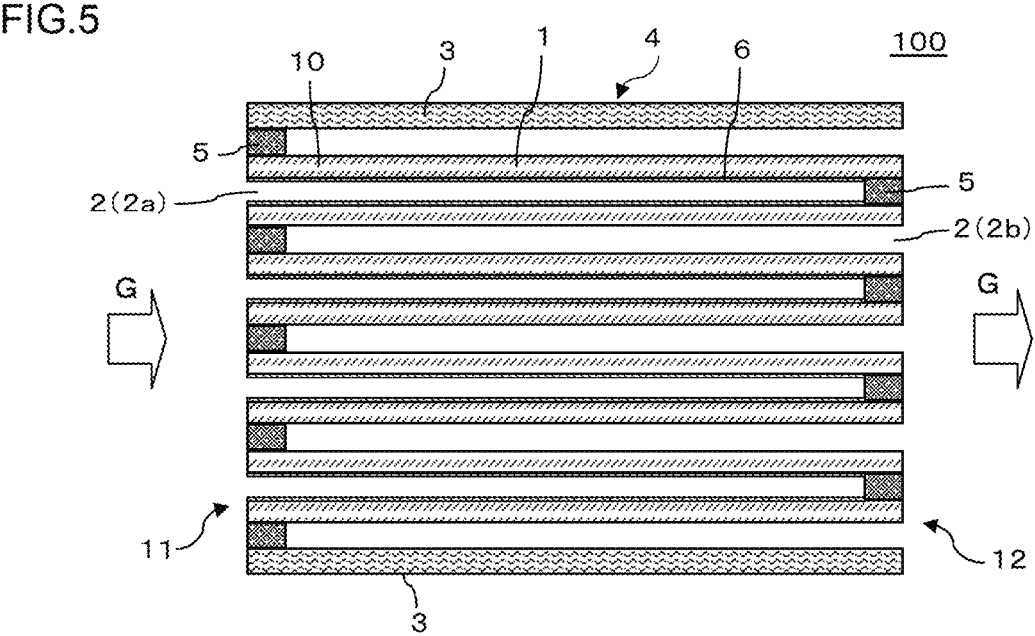
FIG. 5 is a schematic cross sectional view along the line A-A' of FIG. 3.

Herein, FIG. 1 is a schematic perspective view of one embodiment of a plugged honeycomb structure of the present invention from its inflow-side end face. FIG. 2 is a schematic perspective view of the plugged honeycomb structure shown in FIG. 1 from its outflow-side end face. FIG. 3 is a schematic plan view of the plugged honeycomb structure shown in FIG. 1 from the inflow-side end face. FIG. 4 is a schematic plan view of the plugged honeycomb structure shown in FIG. 1 from the outflow-side end face. FIG. 5 is a schematic cross sectional view along the line A-A' of FIG. 3. In FIG. 5, G denotes fluid (e.g., exhaust gas) passing through cells, and the fluid moves in the direction of the arrow indicated with G.

The partition wall base material 1 of the plugged honeycomb structure 100 is formed by a base material porous body including cordierite as a main phase, and the trapping layer 6 thereof is formed by a trapping layer porous body including cordierite as a main phase. Since the plugged honeycomb structure 100 includes the trapping layer 6 that is disposed at least at the surface of the partition wall base material of the residual cells 2a, when the plugged honeycomb structure 100 is used as a honeycomb filter, increase in pressure loss during the deposition of particulate matter can be suppressed. Further the filter has high efficiency of trapping particulate matter. Such a base material porous body and a trapping layer porous body include cordierite as their main phases, and so the filter has excellent thermal shock resistance and hardly generates breakage due to thermal shock. Moreover, a part of the trapping layer 6 that penetrates into the pores formed at the partition wall base material 1 has a thickness of 0 to 20 µm. That is, the trapping layer 6 does not penetrate into the pores formed at the partition wall base material 1, or a part of the trapping layer 6 penetrates into the pores formed at the partition wall base material 1 and the part of the trapping layer 6 penetrating into the pores formed at the partition wall base material 1 has a thickness of 20 µm or less. Therefore, when the plugged honeycomb structure 100 is used as a honeycomb filter, it has low initial pressure loss. Hereinafter "the thickness of the part of the trapping layer penetrating into the pores formed at the partition wall base material may be called a "penetrating depth of the trapping layer".

The thickness of the part of the trapping layer penetrating into the pores formed at the partition wall base material (penetrating depth of the trapping layer) can be obtained by the following method. Firstly, a test piece is cut out from the partition wall of the plugged honeycomb structure, which is then embedded in resin. Next, the test piece embedded in the resin is cut in the direction perpendicular to the cell extending direction, and the cutting plane is ground. Next, an image of the ground cutting plane is taken using a scanning electron microscope to obtain a reflecting electron image at 1,000-fold magnification. This reflecting electron image is processed to measure the penetrating depth of the trapping layer.

Specifically, the reflecting electron image is firstly binarized using "Image-Pro Plus 7.0" (product name) produced by Media Cybernetics Inc. In such a binarized image, the thickness of the partition wall including the trapping layer and the partition wall base material is measured. Next, the outline of the substantive part of the partition wall is extracted. Next, the partition wall base material and the trapping layer are visually distinguished in the binarized image. Next, any one rectangular measurement region is selected in the visually distinguished partition wall base material part. The rectangular measurement region has a length of its sides such that a side parallel to the cell extending direction has a length of 100 µm, and a side parallel to the direction perpendicular to the cell extending direction has a length that is 50% or more of the thickness of the partition wall base material. Next, the length obtained by adding all of the lengths of the extracted outline in the aforementioned rectangular measurement region is set as the perimeter length of the partition wall base material. Next, in the aforementioned rectangular measurement region, the area of the substantive part of the partition wall base material is measured. The "substantive part of the partition wall base material" refers to a part that is distinguished from the pore parts of the partition wall base material by the outline of the substantive part of the partition wall base material. Then, the value obtained by dividing the perimeter length of the partition wall base material by the area of the substantive part of the partition wall base material is set as the "pore surface area per unit volume of the partition wall base material". Next, similarly to the pore surface area per unit volume of the partition wall base material, the pore surface area per unit volume of the trapping layer is measured at the trapping layer part. Herein, the rectangular measurement region to obtain the pore surface area per unit volume of the trapping layer is set as follows. The rectangular measurement region has a length of its sides such that a side parallel to the cell extending direction has a length of 100 µm, and a side parallel to the direction perpendicular to the cell extending direction has a length that is 50% or more of the thickness of the trapping layer. For such a rectangular measurement region, the value obtained similarly to the pore surface area per unit volume of the partition wall base material is set as the "pore surface area per unit volume of the trapping layer". Herein, the "pore surface area" refers to the "area of the wall plane (the surface of the partition wall exposed to the pores) in the pores". Then, the "pore surface area per unit volume" refers to the total value of the "pore surface area" for all of the pores existing in unit volume of the substantive part. In the reflecting electron image, the partition wall base material and the trapping layer are visually distinguished. Herein, the penetrating region that is judged that the trapping layer penetrates into the partition wall base material is not considered as the region of the trapping layer or the region of the partition wall base material, and the pore surface area per unit volume of the trapping layer and the partition wall base material is obtained for each of the regions other than the penetrating region.

When the partition wall base material and the trapping layer are visually distinguished in a reflecting electron image, they are distinguished as follows. Firstly the reflecting electron image is placed so that the trapping layer surface side is the upside of the sheet, and each of 5 observers selected at random is asked to draw two parallel lines of 100 µm in the cell extending direction, whereby each of the 5 observers individually distinguishes the penetrating region. Herein, the line closer to the trapping layer surface is called a first line P and the residual line is called a second line Q. Then, the shortest distance from the trapping layer surface to the first line P is set as length L. The shortest distance between the first line P and the second line Q is set as length M. Next, among "5 lengths L" obtained from the first lines P drawn by the 5 observers in the reflecting electron image, the longest one and the shortest one are excluded, and the average $L_{av}$ of the residual three lengths L is obtained. Similarly, among "5 lengths M" obtained from the second lines Q drawn by the 5 observers in the reflecting electron image, the longest one and the shortest one are excluded, and the average $M_{av}$ of the residual three lengths M is obtained. Next, line A is drawn on the reflecting electron image so that the distance from the surface of the trapping layer equals the value of the "average $L_{av}$" and line B is drawn on the reflecting electron image so that the distance from the surface of line A equals the value of the "average $M_{av}$". Then, a part between line A and line B is a penetrating region on the reflecting electron image. Then, when the reflecting electron image is placed so that the trapping layer surface side is upside of the sheet, the region above line A (the region between line A and the trapping layer surface) is the trapping layer and the region below line B is the partition wall base material.

Figure 6:
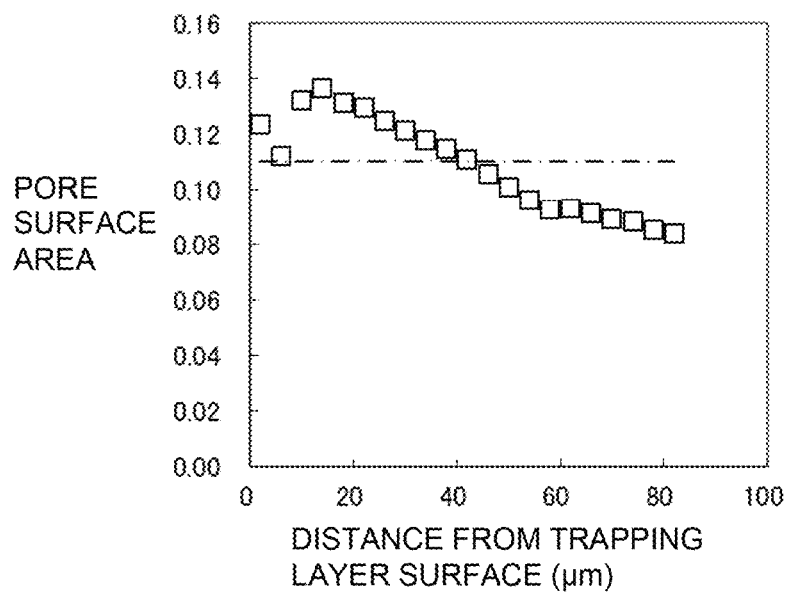
FIG. 6 is a graph showing the pore surface area per unit volume with respect to the distance (μm) from the trapping layer surface.

Next, the partition wall is divided in the binarized image while setting the trapping layer surface as the reference (0 µm) so as to divide the partition wall into every 4 µm toward the partition wall base material, and the pore surface area per unit volume is measured for each of the divided regions. Herein, each of the divided regions has a length in the direction parallel to the cell extending direction that is 100 µm. Next, using the pore surface area per unit volume for each of the measured regions, the average pore surface area per unit volume is calculated for the region from the trapping layer surface to each region. For instance, the average pore surface area per unit volume in the range from the trapping layer surface to 12 µm can be calculated as the average of the values of the pore surface area per unit volume for the following three regions. The three regions to calculate the average (average pore surface area) are the region from the trapping layer surface (0 µm) to 4 µm, the region from 4 µm to 8 µm, and the region from 8 µm to 12 µm. Then, the relationship between the average pore surface area per unit volume in the range from the trapping layer surface (0 µm) to each region and the distance from the trapping layer surface is shown in the diagram as a graph in FIG. 6, for example. In this graph showing the relationship, the vertical axis represents the average pore surface area per unit volume in the range from the trapping layer surface to 4n (n: positive integer) µm. In this graph showing the relationship, the horizontal axis represents the distance from the trapping layer surface. The values on the vertical axis of this graph (i.e., the values of average pore surface area per unit volume in the range from the trapping layer surface to 4n (n: positive integer) µm) indicates the values corresponding to the distance from the trapping layer surface that is 4n−2 µm. For instance, the graph shows the "value of the distance from the trapping layer surface that is 10 µm" as the "value of average pore surface area per unit volume in the range from the trapping layer surface to 12 µm". In FIG. 6, open squares indicate the average pore surface area per unit volume in the range from the trapping layer surface (0 µm) to each region. Hereinafter, each point mapped in the graph and indicating the average pore surface area per unit volume in the range from the trapping layer surface (0 µm) to each region may be called a "plot".

Figure 7:
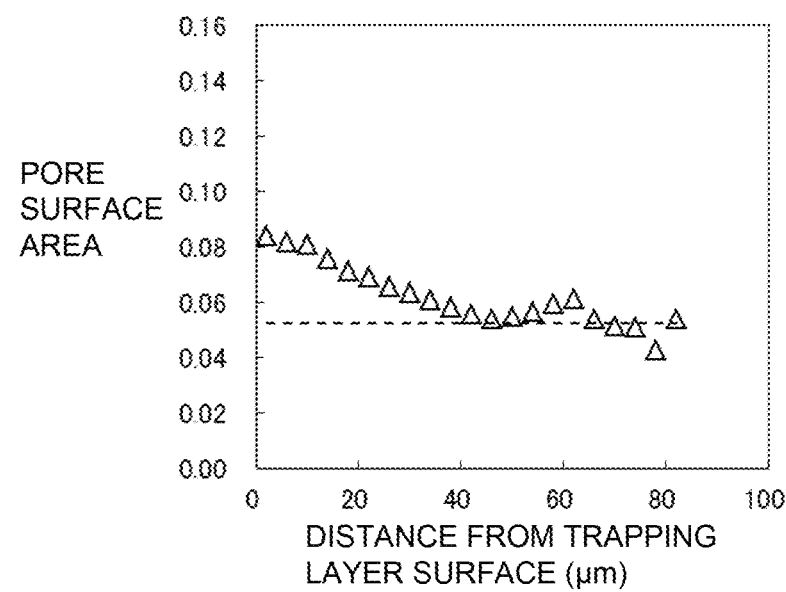
FIG. 7 is a graph showing the pore surface area per unit volume with respect to the distance (μm) from the trapping layer surface.

Next, comparison is made between the values of average pore surface area per unit volume in the range from the trapping layer surface to each region and the value of the pore surface area per unit volume of the trapping layer. For instance, in FIG. 6, the value of "the pore surface area per unit volume of the trapping layer" is indicated with the dotted line on the diagram as the graph. In this comparison, the point is found where a difference between both of the values is the smallest and the value of the average pore surface area per unit volume in the range from one trapping layer surface to each region monotonously decreases toward the partition wall base material. Then, the distance from the trapping layer surface at this point is read from the graph, and the read value of the distance is used as the thickness of the trapping layer only. The thus obtained "thickness of the trapping layer only" is the thickness of the trapping layer that does not include the penetrating region. Herein in FIG. 6 the thickness of the trapping layer only is 42 µm. Similarly, the thickness of the partition wall base material only is obtained. That is, the plane that is parallel to the cell extending direction and that divides the thickness of the partition wall into halves is used as the reference. Hereinafter, the "plane that is parallel to the cell extending direction and that divides the thickness of the partition wall into halves" may be called a partition wall center plane. The partition wall is divided for every 4 µm from the trapping layer surface toward the partition wall center plane. Then, the relationship between the average pore surface area per unit volume in the range from the region including the partition wall center plane to each region and the distance from the trapping layer surface is shown in the diagram as a graph in FIG. 7, for example. In FIG. 7, open triangles indicate the average pore surface area per unit volume in the range from the region including the partition wall (82 µm) to each region. Then, comparison is made between these plots and the pore surface area per unit volume of the partition wall base material as stated above, and the point is found where a difference between both of the values is the smallest and the value of the plots monotonously increases toward the trapping layer surface, and then the distance from the region including the partition wall center plane to the point is calculated, and this value is used as the thickness of the partition wall base material only. Herein in FIG. 7 the thickness of the partition wall base material only is 40 μm. Then, the value obtained by subtracting the sum of the thickness of the trapping layer only and the thickness of the partition wall base material only from the distance from the trapping layer surface to the center of the region including the partition wall center plane is the thickness of the part (penetrating region) of the trapping layer that penetrates into the pores of the partition wall base material. In FIG. 7, the center of the region including the partition wall center plane is located at the distance of 82 μm from the trapping layer surface. In this measurement, since the partition wall is divided for every 4 μm, and the penetrating depth is obtained using the pore surface area per unit volume in each of the divided regions, the penetrating depths of the trapping layer are digital values, such as 0 μm, 4 μm, 8 μm, . . . .

Herein FIG. 6 is a graph showing the pore surface area per unit volume with respect to the distance (μm) from the trapping layer surface, and FIG. 7 is a graph showing the pore surface area per unit volume with respect to the distance (μm) from the trapping layer surface.

The thickness (penetrating depth of the trapping layer) of the part of the trapping layer that penetrates into the pores formed at the partition wall base material is 0 to 20 μm. That is, the trapping layer does not penetrate into the pores formed at the partition wall base material, or a part of the trapping layer penetrates into the pores formed at the partition wall base material and the part of the trapping layer penetrating into the pores formed at the partition wall base material has a thickness of 20 μm or less. The penetrating depth of the trapping layer is 0 to 16 μm preferably, 0 to 12 μm more preferably, and 0 to 8 μm particularly preferably. A smaller penetrating depth of the trapping layer means smaller initial pressure loss when the plugged honeycomb structure is used as a filter. Herein, the penetrating depth of the trapping layer is the value measured by the method for measuring the penetrating depth of the trapping layer as stated above, and the penetrating depth of the trapping layer is obtained by dividing the partition wall for every 4 μm and using the pore surface area per unit volume in each of the divided regions. Therefore the "penetrating depth of the trapping layer being 0 μm" means that no penetration of the trapping layer is found into pores in the measurement of the penetrating depth of the trapping layer. Accordingly, in the measurement of the penetrating depth of the trapping layer as stated above, the "penetrating depth of the trapping layer being 0 μm" includes the case where the trapping layer does not penetrate into the pores formed at the partition wall base material actually and the case where the penetrating depth of the trapping layer into the pores is the measurement limit or less (i.e., less than 4 μm).

The trapping layer is a porous layer (porous trapping layer) formed by a trapping layer porous body including cordierite as a main phase. Herein, the "porous trapping layer" refers to a layer where the pore surface area per unit volume of the trapping layer is 0.01 $\mu m^{-1}$ or more. On the contrary, the trapping layer where the pore surface area per unit volume of the trapping layer is less than 0.01 $\mu m^{-1}$ refers to a "compact trapping layer" to be distinguished from the "porous trapping layer" as stated above. The plugged honeycomb structure of the present embodiment includes the porous trapping layer where the pore surface area per unit volume of the trapping layer is 0.01 $\mu m^{-1}$ or more, and so it has low initial pressure loss and excellent trapping efficiency of particulate matter. Hereinafter the "compact trapping layer" may be called a "dense trapping layer". The formation of the compact trapping layer as stated above at the surface of the partition wall base material may be called "the trapping layer becoming dense". Note here that the pore surface area per unit volume of the trapping layer can be obtained by the method described as the method for measuring the "thickness (penetrating depth of the trapping layer) of the part of the trapping layer that penetrates into the pores formed at the partition wall base material" as stated above.

The "main phase" in the base material porous body forming the partition wall base material and the trapping layer porous body forming the trapping layer refers to substance of 80 mass % or more in the mass ratio. The ratio of mass of each "main phase" in the base material porous body and the trapping layer porous body accounting for in the base material porous body and the trapping layer porous body can be obtained as follows.

The ratio of mass of the "main phase" in the base material porous body accounting for in the base material porous body can be obtained as follows. Firstly a test piece is cut out from the partition wall of the plugged honeycomb structure. The plane where the trapping layer is formed is ground by 50 μm or more in the direction perpendicular to the cell extending direction of the test piece so as to obtain a test piece of the partition wall base material only. Next, the obtained test piece of the partition wall base material only is pulverized into a powder sample. Next, the crystalline phase of the powder sample is identified using a XRD. Next, the amount of each crystalline phase identified is determined by a Reference Intensity Ratio (RIR) method. Then, the ratio of mass of the "main phase" with respect to the total mass of each crystalline phase is used as the ratio of mass of the "main phase" in the base material porous body accounting for in the base material porous body.

The ratio of mass of the "main phase" in the trapping layer porous body accounting for in the trapping layer porous body can be obtained as follows. Firstly a test piece is cut out from the partition wall of the plugged honeycomb structure. Next, the crystalline phase at the trapping layer surface of the obtained test piece is identified using an X-ray microdiffractometer. The measurement using the X-ray microdiffractometer is performed at any 3 points of the test piece, and the measurement range of one measurement point is a circle of 500 μm in diameter. Next, the amount of each crystalline phase identified is determined by a Reference Intensity Ratio (RIR) method. Next, the average of the ratio of mass of each crystalline phase is obtained from the measurement results at the 3 points. Then, the ratio of mass of the "main phase" with respect to the total of the averages of the ratios of mass of the crystalline phases is used as the ratio of mass of the "main phase" in the trapping layer porous body accounting for in the trapping layer porous body.

The base material porous body forming the partition wall base material includes cordierite as the main phase. The base material porous body includes 80 mass % or more of cordierite preferably, 90 mass % or more of cordierite more preferably and 95 mass % or more of cordierite still more preferably, and consists of cordierite particularly preferably. "The base material porous body consists of cordierite"

means that the substantive component thereof is cordierite, and it does not include components other than additives, such as sintering aid, and impurities that are present inevitably. The content ratio of additives, such as sintering aid, and impurities that are present inevitably in the base material porous body is 20 mass % or less preferably. If the amount of cordierite included in the base material porous body is less than 80 mass %, the plugged honeycomb structure may have decreased strength and thermal shock resistance. The ratio of mass of cordierite accounting for in the mass of the base material porous body can be obtained similarly to the method to obtain the ratio of mass of the main phase of the base material porous body forming the partition wall base material as stated above. That is, a powder sample obtained as stated above is used, and the amount of a crystalline phase of cordierite identified by an XRD is determined by a RIR method, whereby the ratio of mass of cordierite accounting for in the mass of the base material porous body can be obtained.

The trapping layer porous body forming the trapping layer includes cordierite as the main phase. The trapping layer porous body includes 80 mass % or more of cordierite preferably, 90 mass % or more of cordierite more preferably, 95 mass % or more of cordierite still more preferably, and consists of cordierite particularly preferably. "The trapping layer porous body consists of cordierite" means that the substantive component thereof is cordierite, and it does not include components other than impurities that are present inevitably. The content ratio of impurities that are present inevitably in the trapping layer porous body is 20 mass % or less preferably. If the amount of cordierite included in the trapping layer porous body is less than 80 mass %, the trapping layer of the plugged honeycomb structure may have decreased thermal shock resistance. The ratio of mass of cordierite accounting for in the mass of the trapping layer porous body can be measured as follows. Firstly a test piece is cut out from the partition wall of the plugged honeycomb structure, and the ratio of mass can be obtained similarly to the method for obtaining the ratio of mass of the main phase of the trapping layer porous body forming the trapping layer as stated above. That is, the test piece as stated above is used to identify a crystalline phase of cordierite by an X-ray micro-diffractometer, and the amount of the crystalline phase of cordierite is determined by a RIR method, whereby the ratio of mass of cordierite accounting for in the trapping layer porous body can be obtained.

The thickness of the partition wall base material is 100 to 500 µm preferably, 100 to 350 µm more preferably, and 150 to 350 µm particularly preferably. If the thickness of the partition wall base material is less than 100 µm, the plugged honeycomb structure may have decreased strength and trapping performance of particulate matter. If the thickness of the partition wall base material exceeds 500 µm, when the plugged honeycomb structure is used as a honeycomb filter, the initial pressure loss thereof may increase. Note here that the thickness of the partition wall base material can be obtained by subtracting the value of the "thickens of the trapping layer only" from the value of the "thickness of the partition wall" that is obtained at the measurement of the thickness (penetrating depth of the trapping layer) of the part of the trapping layer that penetrates into the pores formed at the partition wall base material.

The partition wall base material (in other words, the base material porous body forming the partition wall base material) has porosity of 30 to 50% preferably, 30 to 45% more preferably, and 35 to 45% particularly preferably. Smaller porosity of the partition wall base material means higher heat capacity of the plugged honeycomb structure, and so when it is used as a honeycomb filter, the highest temperature during regeneration can be lowered. On the contrary, however, smaller porosity of the partition wall base material tends to increase the increase of pressure loss when particulate matter is deposited. Since the trapping layer has the effect to decrease the increase of pressure loss when particulate matter is deposited, the partition wall base material of low porosity and the trapping layer may be combined for use, whereby the highest temperature during regeneration can be lowered, and the increase of pressure loss during deposition of particulate matter can be effectively suppressed. The preferable numerical range of the porosity of the partition wall base material as stated above particularly leads to an embodiment that is more preferable in the combination of the partition wall base material of low porosity and the trapping layer.

The porosity of the partition wall base material can be measured as follows. Firstly, a test piece is cut out from the partition wall of the plugged honeycomb structure. Next, the test piece is embedded in resin, and a cross section perpendicular to the cell extending direction of the plugged honeycomb structure is cut out. The cross section is ground, and a reflecting electron image thereof at 500-fold magnification is taken using a scanning electron microscope. The partition wall base material and the trapping layer of the partition wall in the partition wall are visually distinguished in the obtained image. Next, a binarized image is obtained using image processing software, whereby the porosity of the partition wall base material is measured. Specifically, the area of the substantive part of the partition wall base material and the area of the pore part of the partition wall base material are measured in the binarized image. Then, the ratio of area of the pore part of the partition wall base material with respect to the "sum of the area of the substantive part of the partition wall base material and the area of the pore part of the partition wall base material" is measured, which is used as the porosity. One example of the image processing software includes "Image-Pro Plus 7.0" (product name) produced by Media Cybernetics Inc.

The partition wall base material has the average pore diameter of 10 to 40 µm preferably, 15 to 35 µm more preferably, and 20 to 30 µm particularly preferably. If the average pore diameter of the partition wall base material is large, the initial pressure loss can be lowered, but particulate matter included in exhaust gas may flow through the pores of the partition wall base material and leak to the outside of the plugged honeycomb structure. If the average pore diameter of the partition wall base material is small, the initial pressure loss may increase.

The average pore diameter of the partition wall base material can be measured in accordance with the method described JP-5426803-B. Specifically a plugged honeycomb structure is divided into halves in the cell extending direction. Then, a test piece of 5 mm×5 mm×5 mm is cut out from one of the two halves of the plugged honeycomb structure. Herein, one plane of the test piece is the face appearing when the plugged honeycomb structure is divided into halves. A partition wall base material part of the obtained test piece is 3-dimensional scanned (CT scanned) to obtain pixel data. Then, porous body data is acquired, in which position information representing the position of a pixel and pixel type information representing whether the pixel is a space pixel representing space or an object pixel representing an object are correlated. Next, a piece of image data of a predetermined solid body is extracted from the obtained pixel data, and analysis processing routine is carried out. The image data of the solid body to which the analysis processing routine is carried out is 96 μm (=1.2 μm×80 pixels) in the X direction, 480 μm (=1.2 μm×400 pixels) in the Y direction, and 480 μm (=1.2 μm×400 pixels) in the Z direction. Herein, the X direction is the thickness direction of the partition wall, and the Y direction and the Z direction are not limited especially as long as the Y direction and the Z direction are orthogonal to the X direction and the Y direction and the Z direction are orthogonal. In the analysis processing routine, a virtual curved surface solid is placed at a pore part of the image, and its equivalent diameter and difference pore volume are obtained. Then, a log differential pore volume that is of base 10 logarithm is obtained by dividing the difference pore volume by a difference value of a logarithm of the equivalent diameter. The log differential pore volume that is of base 10 logarithm represents the volume ratio (cc/cc) of the virtual curved surface solid accounting for in the volume of the space pixel. Then the median of the equivalent diameter is obtained from the distribution of the volume ratio (cc/cc) of the virtual curved surface solid accounting for in the volume of the space pixel having all of the obtained equivalent diameters as the population, and this median of the equivalent diameter is used as the average pore diameter of the partition wall base material.

The average in-plane uniformity index γ of the partition wall base material is preferably 0.7 or more, 0.72 or more preferably and 0.74 or more particularly preferably. The in-plane uniformity index $\gamma_x$ is an index representing uniformity of the flow velocity of fluid in one cross section. When the average in-plane uniformity index γ is less than 0.6 and the flow velocity of fluid is extremely nonuniform, then when the plugged honeycomb structure is used as a honeycomb filter, its initial pressure loss may be high. Herein the upper limit of the in-plane uniformity index $\gamma_x$ is 1 in accordance with the specifications on the in-plane uniformity index $\gamma_x$.

The average in-plane uniformity index γ of the partition wall base material can be measured in accordance with the method described JP-5426803-B. Specifically similarly to the method for measuring the average pore diameter of the partition wall base material, a test piece is cut out from the plugged honeycomb structure, and a partition wall base material part thereof is 3-dimensional scanned (CT scanned) to obtain pixel data. Then, porous body data is acquired from the obtained pixel data, in which position information representing the position of a pixel and pixel type information representing whether the pixel is a space pixel representing space or an object pixel representing an object are correlated. Next, a piece of image data of a predetermined solid body is extracted from the obtained pixel data, and analysis processing routine is carried out. The image data of the solid body to which the analysis processing routine is carried out is 96 μm (=1.2 μm×80 pixels) in the X direction, 480 μm (=1.2 μm×400 pixels) in the Y direction, and 480 μm (=1.2 μm×400 pixels) in the Z direction. Herein, the X direction is the thickness direction of the partition wall, and the Y direction and the Z direction are not limited especially as long as the Y direction and the Z direction are orthogonal to the X direction and the Y direction and the Z direction are orthogonal. In the analysis processing routine, fluid analysis is performed for a pore part of the image, and the values of n, x, $u_{mean}$, $A_i$, and A are obtained, which are necessary to calculate the in-plane uniformity index $\gamma_x$ from the following expression (1).

[Math. 1]

$$\gamma_x = 1 - \frac{1}{2} \sum_{i=1}^{n} \frac{|u_i - u_{mean}| \cdot A_i}{u_{mean} \cdot A} \quad (1)$$

Herein in the above expression (1), n denotes the number of virtual curved surface solids in the cross section, x denotes the distance [m] between the cross section and the inflow plane, $u_i$ denotes the average flow velocity (i=1, 2, . . . , n) [m/s] for each of the n pieces of virtual curved surface solids in the cross section, $u_{mean}$ denotes the average (=($u_1+u_2+$ . . . $u_n$)/n) [m/s] of the average flow velocity $u_i$ in the cross section, and $A_i$ denotes the cross sectional area (i=1, 2, . . . , n) [m²] of each virtual curved surface solid in the cross section. A denotes the total cross sectional area (=$A_1+A_2+$ . . . $A_n$) [m²] of the virtual curved surface solids in the cross section.

The average flow velocity $u_i$ of the n pieces in the cross section and the cross sectional area $A_i$ of each virtual curved surface solid in the cross section are derived as follows. Firstly, a curved surface solid pixel included in the cross section as a derivation target of the in-plane uniformity index $\gamma_x$ is specified on the basis of the distance x between cross section and inflow plane, and the position information and the type information on the porous body data. Next, the number of types of identification symbols of the virtual curved surface solid correlated with the specified curved surface solid pixel is counted, and the number is used as the number n of the virtual curved surface solids in the cross section. Subsequently, one of the identification symbols for the virtual curved surface solids in the cross section is selected. Then, for the curved surface solid pixel correlated with the selected identification symbol, i.e., the curved surface solid pixel making up one virtual curved surface solid, the flow velocity vector correlated with each curved surface solid pixel is examined by fluid analysis processing based on the lattice Boltzmann method, and the average of components of the flow velocity in the direction perpendicular to the cross section of the curved surface solid pixel is derived, which is used as the average flow velocity $u_1$. Further, the number of pixels of the curved surface solid pixel correlated with the selected identification symbol is counted, and the product of the number of pixels and the area of the curved surface solid pixel along the cross section is used as the cross sectional area $A_1$. Similarly, the identification symbol selected is changed one by one, whereby the average flow velocity $u_2, u_3, \ldots, u_n$ and the cross sectional area $A_2, A_3, \ldots, A_n$ for the n pieces of virtual curved surface solids in the cross section are derived. Then, the in-plane uniformity index $\gamma_x$ is derived for 80 (=96 μm/1.2 μm) cross sections where the distance x is changed by every 1.2 μm. Then, the average of the 80 in-plane uniformity indexes $\gamma_x$ is used as the average in-plane uniformity index γ of the partition wall base material.

Preferably the base material porous body forming the partition wall base material and including cordierite as the main phase includes, as sintering aid, at least one type selected from the group consisting of $ZrO_2$, $TiO_2$, $CeO_2$, and $Y_2O_3$. Since such sintering aid lowers the melting point of cordierite, sintering of the base material porous body is promoted when a plugged honeycomb formed body, which becomes the plugged honeycomb structure after firing, is fired. Such promotion of sintering of the base material porous body enables adjustment of the porosity of the partition wall base material.

When the base material porous body forming the partition wall base material and including cordierite as the main phase includes the aforementioned sintering aid, the sintering aid is included preferably at the mass ratio as follows. Letting that the total mass of MgO, $Al_2O_3$, and $SiO_2$ in the base material porous body is 100 parts by mass, 1 to 5 parts by mass of the sintering aid is preferably included, 1 to 3 parts by mass more preferably, and 1 to 2 parts by mass particularly preferably. If the amount of the sintering aid in the base material porous body is too small, the effect of adjusting the porosity due to the sintering aid added cannot be obtained sufficiently. If the amount of the sintering aid in the base material porous body is too large, the base material porous body may have a large thermal expansion rate and the thermal shock resistance may deteriorate.

Measurement for sintering aid in the base material porous body forming the partition wall base material can be performed as follows. Firstly, a test piece is cut out from the partition wall of the plugged honeycomb structure. Next, the plane where the trapping layer is formed is ground by 50 µm or more in the direction perpendicular to the cell extending direction of the cut out test piece so as to obtain a test piece of the partition wall base material only. Next, the obtained test piece of the partition wall base material only is pulverized into a powder sample. Then, the qualitative/quantitative analysis is performed for the powder sample by fluorescent X-ray FP method.

The trapping layer has the average thickness, which is the average of thickness of the trapping layer, that is preferably 10 to 50 µm, 10 to 40 µm more preferably and 10 to 30 µm particularly preferably. If the average thickness of the trapping layer is less than 10 µm, when the plugged honeycomb structure is used as a filter, particulate matter trapping performance of the filter may deteriorate. If the average thickness of the trapping layer exceeds 50 µm, the trapping layer is too thick, and the initial pressure loss may increase.

Figure 8:
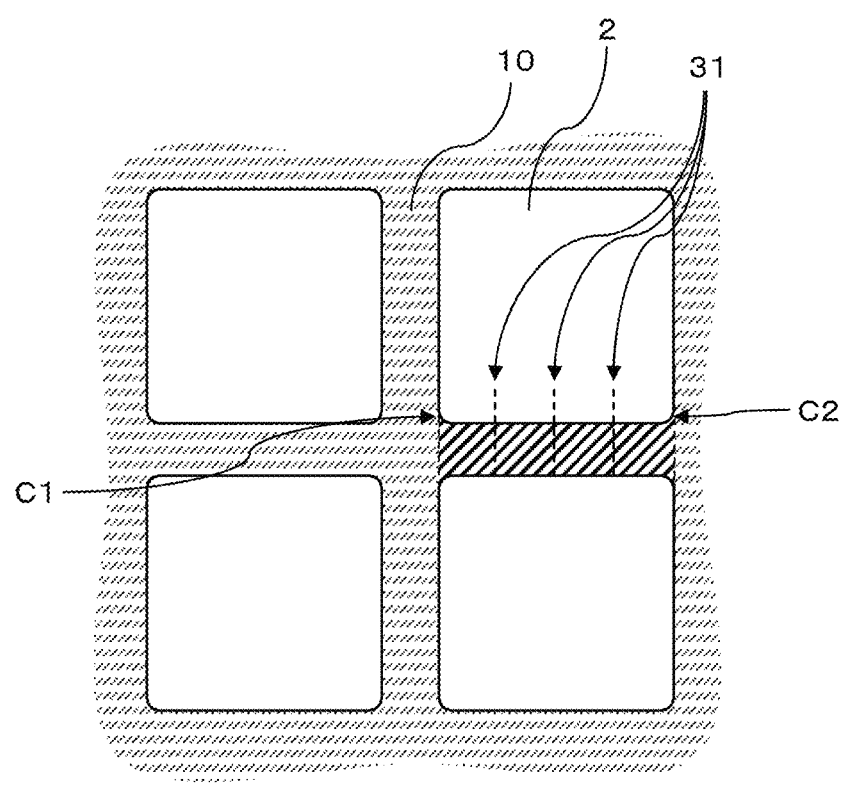
FIG. 8 describes a method for measuring the average thickness of a trapping layer, which is an enlarged schematic view of the cross section perpendicular to the cell extending direction of the plugged honeycomb structure.

The average thickness of the trapping layer can be measured as follows. A test piece is cut out from the partition wall of the plugged honeycomb structure, and is embedded in resin. Next, the test piece embedded in resin is cut in the direction perpendicular to the cell extending direction, and the cutting plane is ground. Next, an image of the ground cutting plane is taken using a scanning electron microscope to obtain a reflecting electron image at 500-fold magnification, which is then binarized using image processing software. Next, the average thickness and the standard deviation of the trapping layer are measured in the binarized image. Referring to FIG. 8, the following specifically describes a method for measuring the average thickness of the trapping layer. FIG. 8 describes a method for measuring the average thickness of a trapping layer, which is an enlarged schematic view of the cross section perpendicular to the cell extending direction of the plugged honeycomb structure.

For the measurement of average thickness of the trapping layer, the plugged honeycomb structure is firstly divided equally into four test pieces in the direction perpendicular to the cell extending direction. Next, the four test pieces are embedded in resin, and the cutting planes are ground. Next, among six cross sections as a result of cutting at three points when the test piece is divided equally into four, three cross sections are selected, and the thickness of the trapping layer is measured. For the selection of cross sections, one cross section may be selected for one cutting plane. Specifically, any one cell is selected from one cross section of the three cross sections as stated above. Then, the thickness of the trapping layer is measured for the partition walls defining any two sides among the partition walls defining the sides of the cell. For instance, in FIG. 8, the partition wall 10 is placed in a grid pattern extending vertically and horizontally on the sheet, and the range from corner C1 of cell 2 and corner C2 of cell 2 is the partition wall 10 defining one side of the cell. Specifically, as shown in FIG. 8, the partition wall defining one side of the cell is divided equally into four regions virtually in the direction perpendicular to the one side. Next, an image of a part 31 (virtually divided part 31) where the four virtually divided regions are adjacent to each other is taken using a scanning electron microscope to obtain three reflecting electron images at 500-fold magnification. Next, each of the obtained reflecting electron images is binarized using image processing software. Then, in each of the binarized images, the trapping layer and the partition wall base material are visually distinguished, and the thickness of the trapping layer at each adjacent part 31 (virtually divided part 31) as stated above is measured. Similar measurement is performed for the partition wall 10 defining other sides of the cell as well.

Next, the thickness of the trapping layer is measured as stated above for the residual two cross sections as well. Then, the average of the obtained thicknesses of the trapping layer at 18 places is used as the average thickness of the trapping layer. Then, the standard deviation of the thus obtained thicknesses of the trapping layer at 18 places is used as the standard deviation of the thickness of the trapping layer. One example of the image processing software includes "Image-Pro Plus 7.0" (product name) produced by Media Cybernetics Inc.

The standard deviation of thickness of the trapping layer is 10 µm or less preferably, 8 µm or less more preferably, and 5 µm or less particularly preferably. If the standard deviation of thickness of the trapping layer is too large, the initial pressure loss may increase. The practical lower limit of the standard deviation of thickness of the trapping layer is 1 µm.

The trapping layer has porosity of 40 to 80% preferably, 45 to 75% more preferably, and 50 to 70% particularly preferably. If the porosity of the trapping layer is less than 40%, the initial pressure loss increases and the increase of pressure loss during deposition of particulate matter also may increase. If the porosity of the trapping layer exceeds 80%, cracks may occur at the trapping layer when the trapping layer is formed at the plugged honeycomb structure, and so the performance to trap particulate matter may deteriorate. The porosity of the trapping layer can be measured similarly to the porosity of the partition wall base material.

The trapping layer has an open frontal area of 15 to 50% preferably, 20 to 40% more preferably, and 25 to 40% particularly preferably. If the open frontal area of the trapping layer is less than 15%, the initial pressure loss increases, and if the open frontal area of the trapping layer exceeds 50%, the performance to trap particulate matter may deteriorate.

The open frontal area of the trapping layer can be measured as follows. The partition wall is cut out from the plugged honeycomb structure, an image of the surface of the trapping layer is taken using a scanning electron microscope, and the open frontal area of the trapping layer is measured using image processing software. Specifically, a reflecting electron image of the surface of the trapping layer of the partition wall cut out from the plugged honeycomb structure is taken at 500-fold magnification. Next, the obtained reflecting electron image is binarized using image processing software, followed by noise removal using a median filter. Next, in the image after noise removal, the area ratio of the pore part with respect to the "sum of the area of the pore part and the area of the substantive part of the trapping layer" is measured, which is used as the open frontal area of the trapping layer. One example of the image processing software includes "Image-Pro Plus 7.0" (product name) produced by Media Cybernetics Inc.

The trapping layer has the average pore diameter of 1 to 3 preferably, 1.5 to 3 μm more preferably, and 2 to 3 μm preferably. If the average pore diameter of the trapping layer is less than 1 μm, the initial pressure loss may increase, and if it exceeds 3 μm, the performance to trap particulate matter may deteriorate.

The average pore diameter of the trapping layer can be measured as follows. Firstly, an image after noise removal is obtained similarly to the method for measuring the open frontal area of the trapping layer. In the obtained "image after noise removal", a distance map of the pore part is created, and the average of the maximum density in the distance map is measured, which is used as the average pore diameter. The distance map is an image obtained by representing the image after noise removal in the 16-bit gray scale form. In the distance map, the brightness of one pixel represents the distance from the outline part to the one pixel.

The trapping layer has a pore surface area per unit volume of 0.05 to 0.3 $\mu m^{-1}$ preferably, 0.1 to 0.2 $\mu m^{-1}$ more preferably, and 0.15 to 0.2 $\mu m^{-1}$ particularly preferably. If the pore surface area per unit volume of the trapping layer is smaller than 0.05 $\mu m^{-1}$, the performance to trap particulate matter may deteriorate, and if it exceeds 0.3 $\mu m^{-1}$, the initial pressure loss may increase.

The pore surface area per unit volume of the trapping layer is preferably twice or more of the pore surface area per unit volume of the partition wall base material, 5 times or more preferably, and 10 times or more particularly preferably. With this configuration, particulate matter can be trapped favorably. Such a configuration further can decrease the initial pressure loss, and can suppress increase in pressure loss during deposition of particulate matter. The pore surface area per unit volume of the trapping layer and the pore surface area per unit volume of the partition wall base material can be obtained as follows, in accordance with the method that is described about the thickness of the part of the trapping layer that penetrates into the pores formed at the partition wall base material (penetrating depth of the trapping layer).

Firstly, a test piece is cut out from the partition wall of the plugged honeycomb structure, which is embedded in resin. Next, the test piece embedded in resin is cut in the direction perpendicular to the cell extending direction, and the cutting plane is ground. Next, an image of the ground cutting plane is taken using a scanning electron microscope to obtain a reflecting electron image at 1,000-fold magnification. This reflecting electron image is processed to measure the pore surface area per unit volume of the trapping layer and the pore surface area per unit volume of the partition wall base material. Specifically, the reflecting electron image is firstly binarized using "Image-Pro Plus 7.0" (product name) produced by Media Cybernetics Inc. Next, the outline of the substantive part of the partition wall base material is extracted, and the length obtained by adding all of the lengths of the outline is set as the perimeter length. Next, the area of the substantive part of the partition wall base material is measured. Then, the value obtained by dividing the perimeter length by the area of the substantive part of the partition wall base material is used as the pore surface area per unit volume, whereby the pore surface area of the partition wall base material is obtained. Similarly the pore surface area per unit volume of the trapping layer is obtained. Herein, the "pore surface area" refers to the "area of the wall plane (the surface of the partition wall exposed to the pores) in the pores". In the reflecting electron image, the partition wall base material and the trapping layer are visually distinguished. Herein, the penetrating region that is judged that the trapping layer penetrates into the partition wall base material is not considered as the region of the trapping layer or the region of the partition wall base material, and the pore surface area per unit volume of the trapping layer and the partition wall base material is obtained for each of the regions other than the penetrating region.

The cell density of a honeycomb substrate is not limited especially. The cell density of the honeycomb substrate is 15 to 100 cells/cm² preferably, 30 to 65 cells/cm² more preferably, and 30 to 50 cells/cm² particularly preferably. Such a range of the cell density can lead to low initial pressure loss and improved trapping efficiency when the plugged honeycomb structure is used as a DPF or the like.

The cell shape formed at the honeycomb substrate is not limited especially. Herein, "the cell shape" refers to a shape of the cells at a cross section of the honeycomb substrate orthogonal to the cell extending direction. Examples of the cell shape include a quadrangle, a hexagon, an octagon and the combination thereof.

The shape of the honeycomb substrate is not limited especially, which may be pillar-shaped having a circular bottom face (round pillar-shaped), pillar-shaped having an oval bottom face, pillar-shaped having a polygonal (quadrangle, pentagon, hexagon, heptagon, octagon and the like) bottom face, and the like.

The length from an inflow-side end face to an outflow-side end face of the honeycomb substrate and the size of the cross section of the honeycomb substrate orthogonal to the cell extending direction may be selected appropriately so as to achieve the optimum purification performance when the plugged honeycomb structure of the present embodiment is used as a filter to purify exhaust gas. For instance, the length from the inflow-side end face to the outflow-side end face of the honeycomb substrate is preferably 100 to 500 mm, and 100 to 300 mm more preferably. The area of the cross section of the honeycomb substrate orthogonal to the cell extending direction is 7,000 to 70,000 mm² preferably and 7,000 to 30,000 mm² more preferably.

Catalyst for exhaust gas purification may be loaded at least one of the surface of the partition wall and the pores of the partition wall of the honeycomb substrate. An example of the catalyst include porous $\gamma$-$Al_2O_3$ loaded with platinum group metal. Herein since the catalyst loaded at the partition wall of the honeycomb substrate is an element different from the partition wall (in other words, partition wall base material and trapping layer), "the material forming the porous body" as stated above does not include the catalyst.

The honeycomb substrate of the plugged honeycomb structure may have a segmented structure so as to include a plurality of pillar-shaped honeycomb segments having a partition wall base material, where the plurality of honeycomb segments are bonded while being displaced adjacent to each other so that their side faces are opposed. An example of the plugged honeycomb structure including a segmented structured honeycomb substrate includes a plugged honeycomb structure as shown in the following. The plugged honeycomb structure includes a honeycomb substrate including a plurality of honeycomb segments, where the plurality of honeycomb segments are bonded with a bonding layer while being displaced adjacent to each other so that their side faces are opposed. Each honeycomb segment includes the partition wall base material and an outer wall disposed to surround the partition wall base material. The partition wall base material is porous, which defines a plurality of cells serving as a through channel of fluid and extending from the inflow-side end face to the outflow-side end face. The bonding layer is to bond the outer walls of the honeycomb segments disposed adjacently. This bonding layer may have a function as a buffer for thermal stress generated at the honeycomb substrate. A circumferential wall may be further disposed at the outermost circumference of the bonded member including the plurality of honeycomb segments bonded.

In the segmented structured honeycomb substrate, the partition wall base material of at least one honeycomb segment among the plurality of honeycomb segments preferably is formed by a base material porous body including cordierite as a main phase. In the segmented structured honeycomb substrate, the partition wall base material of all of the honeycomb segments may be formed by a base material porous body including cordierite as a main phase. The bonding layer may have a structure similar to that of a bonding layer of a conventionally known segmented structured honeycomb substrate.

The plugged honeycomb structure may be prepared by making a bonded member including a plurality of honeycomb segments bonded and by processing the circumference of the obtained bonded member by grinding or the like. Such processing of the circumferential part of the bonded member allows the shape of the cross section orthogonal to the extending direction of the cells of the bonded member to be a desired shape, such as a circle. After processing of the circumference of the bonded member, a ceramic material may be applied at the outermost circumference, whereby a circumferential wall may be disposed. Such a so-called segmented structured plugged honeycomb structure honeycomb structure also can have advantageous effects similar to those of a so-called monolithic plugged honeycomb structure as shown in FIGS. 1 to 5.

(2) Method for Manufacturing Plugged Honeycomb Structure:

Next, the following describes a method for manufacturing a plugged honeycomb structure of the present invention (hereinafter this may be called "a plugged honeycomb structure manufacturing method"). The method for manufacturing a plugged honeycomb structure includes the step of applying slurry including a trapping layer forming raw material and combustible particulates dispersed in water to the surface of a partition wall base material in the honeycomb substrate before firing (i.e., the partition wall base material before firing). Hereinafter, the "step of applying slurry including a trapping layer forming raw material and combustible particulates dispersed in water to the surface of a partition wall base material in the honeycomb substrate before firing" may be called a "trapping layer forming slurry application step". According to such a method for manufacturing a plugged honeycomb structure, uniformity in thickness of the trapping layer can be improved at the cross section perpendicular to the cell extending direction of the honeycomb substrate. The combustible particulates as stated above function as pore former as well to form pores in the trapping layer. Further, the step of applying the slurry as stated above can decrease a part of the trapping layer penetrating into the pores of the partition wall base material.

In the method for manufacturing a plugged honeycomb structure, firstly a honeycomb formed body is prepared, which is to prepare a honeycomb substrate, and the honeycomb formed body is dried to be a honeycomb dried body. This honeycomb dried body is the honeycomb substrate before firing as stated above. In this way, in the method for manufacturing a plugged honeycomb structure, the trapping layer forming slurry application step as stated above is preferably performed before firing of the honeycomb dried body. The following describes the method for manufacturing a plugged honeycomb structure in more details.

(2-1) Forming Step:

In the method for manufacturing a plugged honeycomb structure, a partition wall base material forming raw material is formed at the forming step to make a honeycomb formed body (formed body of the honeycomb substrate) including a not-fired partition wall base material that defines a plurality of cells serving as a through channel of fluid. Specifically, the partition wall base material forming raw material is prepared to make a base material porous body including cordierite as a main phase. The partition wall base material forming raw material is not limited especially as long as it includes cordierite powder. Herein in the forming step, a cordierite forming raw material is not used preferably for the partition wall base material forming raw material to make the base material porous body including cordierite as a main phase. The cordierite forming raw material refers to a raw material that turns cordierite after firing. The partition wall base material forming raw material may further include dispersing medium and additives in addition to the raw material as stated above.

In the partition wall base material forming raw material, the cordierite powder has an average particle diameter of 5 to 50 µm preferably, 10 to 50 µm more preferably and 20 to 50 µm particularly preferably. The average particle diameter of the cordierite powder is a value measured by a laser diffraction/diffusion method.

Examples of the additives include organic binder, inorganic binder, surfactant and pore former. Examples of the dispersing medium include water.

Examples of the organic binder include methylcellulose, hydroxypropoxyl cellulose, hydroxyethylcellulose, carboxymethylcellulose, and polyvinyl alcohol. Examples of the inorganic binder include montmorillonite, silica sol, and alumina sol. Examples of the surfactant include ethylene glycol, fatty acid soap, and polyalcohol. Examples of the pore former, which are not especially limited as long as it forms pores after firing, include starch, foamable resin, water absorbable resin and silica gel.

The particle diameter and the blending amount of the raw material powder as stated above as well as the particle diameter and the blending amount of the pore former powder to be added are adjusted, whereby a porous body with desired porosity and average pore diameter can be obtained.

Next, the obtained partition wall base material forming raw material is kneaded to be a kneaded material. A method for forming a kneaded material is not limited especially, which may be formed using a kneader, a vacuum pugmill or the like, for example.

Next, the obtained kneaded material is extruded, whereby a honeycomb formed body is prepared. Extrusion can be performed using a die having a desired cell shape, partition wall base material thickness and cell density. Next, the obtained honeycomb formed body is dried to obtain a honeycomb dried body that is the dried honeycomb formed body. The drying method is not limited especially. For instance, examples thereof include hot air drying, microwave drying, dielectric drying, reduced-pressure drying, vacuum drying, and freeze-drying. Among them, dielectric drying, microwave drying or hot air drying is preferably performed alone or in combination. Preferable drying conditions are drying temperature at 30 to 150° C. and a drying time of 1 minute to 2 hours. In the present specification, the drying temperature refers to the temperature of atmosphere for drying.

(2-2) First Plugging Step:

In the method for manufacturing a plugged honeycomb structure, after the forming step or the trapping layer forming slurry application step and the firing step described later, a first plugging step and a second plugging step described later may be performed. The following describes, as one example, a method of performing the first plugging step first, followed by the trapping layer forming slurry application step, and the second plugging step and further the firing step, and the method for manufacturing a plugged honeycomb structure is not limited to this. In the first plugging step, open ends of the cells are plugged preferably at any one of the inflow-side end face and the outflow-side end face of the honeycomb dried body. The first plugging step can be performed by filling open ends of the cells of the honeycomb dried body with a plugging material, for example. Herein, the first plugging step may be performed after the forming step of the honeycomb formed body and before drying of the honeycomb formed body.

The first plugging step includes a masking step and a press-fit step, for example. The masking step is to attach a sheet at one end face (e.g., the inflow-side end face) of the honeycomb dried body and boring holes at positions of the sheet overlapping with the "cells to which plugging portions are to be formed". The press-fit step is to press-fit the "end of the honeycomb dried body to which the sheet is attached" into a vessel storing a plugging material to press-fit the plugging material into the cells of the honeycomb dried body. When the plugging material is press-fitted into the cells of the honeycomb dried body, the plugging material passes through the holes formed at the sheet and are charged into the cells in communication with the holes formed at the sheet only. A method for filling with the plugging material can be performed in accordance with a conventionally known method for manufacturing a plugged honeycomb structure. After filling the open ends of the cells with the plugging material, the honeycomb dried body (or the honeycomb formed body) is preferably dried.

(2-3) Trapping Layer Forming Slurry Application Step:

The trapping layer forming slurry application step is to apply slurry including a trapping layer forming raw material and combustible particulates dispersed in water to the surface of a partition wall base material in the honeycomb substrate before firing. The honeycomb substrate before firing may be a honeycomb formed body, which is particularly preferably a honeycomb dried body obtained through the first plugging step as stated above.

The trapping layer forming raw material is not limited especially as long as it includes a cordierite forming raw material. For the cordierite forming raw material, a combination can be selected from MgO, Mg(OH)$_2$, talc, silica, Al(OH)$_3$, alumina and the like so as to form cordierite after firing. In the trapping layer forming slurry application step, cordierite powder is not used preferably as the forming raw material to prepare a trapping layer porous body including cordierite as a main phase.

When the cordierite forming raw material includes alumina, the average particle diameter of alumina is 0.1 to 3 μm preferably, 0.5 to 3 μm more preferably, and 0.5 to 2 μm particularly preferably. The average particle diameter of alumina is a value measured by a laser diffraction/diffusion method.

When the cordierite forming raw material includes silica, the average particle diameter of silica is 0.1 to 10 μm preferably, 0.5 to 10 μm more preferably, and 2 to 10 μm particularly preferably. The average particle diameter of silica is a value measured by a laser diffraction/diffusion method.

Examples of the combustible particulates include carbon black, acrylic resin, a compound including acrylic resin, styrene resin, a compound including styrene resin, butadiene resin, a compound including butadiene resin, urethane resin, and a compound including urethane resin. Especially carbon black is preferable as the combustible particulates.

The average particle diameter of the combustible particulates is 0.05 to 0.5 μm preferably, 0.05 to 0.3 μM more preferably, and 0.1 to 0.3 μm particularly preferably. If the average particle diameter of the combustible particulates is large, uniformity in thickness of the trapping layer may deteriorate at the cross section perpendicular to the cell extending direction of the honeycomb substrate and the cross section parallel to the cell extending direction of the honeycomb substrate. On the contrary, although the lower limit of the average particle diameter of the combustible particulates is not limited especially, the lower limit of the average particle diameter of combustible particles practically available is about 0.05 μm. The average particle diameter of the combustible particulates is a value measured by a laser diffraction/diffusion method.

The mass ratio of the trapping layer forming raw material and the combustible particulates is 20/80 to 80/20 preferably, 30/70 to 70/30 more preferably, and 30/70 to 60/40 particularly preferably. If the ratio of the combustible particulates is too large, porosity of the trapping layer may be too high. On the contrary, if the ratio of the combustible particulates is too small, uniformity in thickness of the trapping layer may deteriorate at the cross section perpendicular to the cell extending direction of the honeycomb substrate and the cross section parallel to the cell extending direction of the honeycomb substrate.

The slurry used in the trapping layer forming slurry application step may include pore former in addition to the combustible particulates. Examples of the pore former include graphite, starch, acrylic resin, phenol resin, melanin resin, urethane resin, silica gel, and silicon resin. The average particle diameter of the pore former is 0.5 to 50 μm preferably, 5 to 30 μm more preferably, and 5 to 20 μm particularly preferably. If the average particle diameter of the pore former is too large (e.g., larger than 50 μm), the trapping efficiency may deteriorate. If the average particle diameter of the pore former is too small (e.g., smaller than 0.5 μm), the initial pressure loss may increase (in other words, the porosity does not increase sufficiently). The average particle diameter of pore former is a value measured by a laser diffraction/diffusion method.

The slurry used in the trapping layer forming slurry application step may include surfactant having a benzene ring. When the slurry includes carbon black as the combustible particulates, the slurry includes surfactant having a benzene ring particularly preferably. Examples of the surfactant having a benzene ring include polyoxyalkylenetribenzylphenylether, sodium salt of naphthalenesulfonic acid.formalin condensate, and polyoxyalkylenedistyrenated phenylether. Such surfactant having a benzene ring functions as dispersing agent of the combustible particulates and reduces the viscosity of slurry, and so slurry can be applied easily.

When the trapping layer forming slurry application step is performed using the honeycomb dried body obtained through the first plugging step, the step is performed preferably while placing the honeycomb dried body vertically so that the end face of the honeycomb dried body with the plugging portion is located above. At this time, the trapping layer forming slurry application step is performed more preferably while attaching a film having holes at the open ends of the cells other than the cells filled with the plugging material at the first plugging step to the other end face of the honeycomb dried body located below. Then slurry including a trapping layer forming raw material and combustible particulates dispersed in water is charged from the end face located below of the honeycomb dried body in such a state. Then, after predetermined time has passed after the filling with the slurry, the slurry filled is discharged. With this configuration, the slurry can be applied to the surface of a precursor of the partition wall base material of the honeycomb dried body. The finally obtained thickness of the trapping layer or the like can be adjusted by adjusting the density of the slurry, the keeping time during charging or the like. Such an application method of slurry allows the slurry to be applied uniformly at the surface of the precursor of the partition wall base material. Further, the trapping layer can be disposed in a predetermined range only from the outflow-side end face in the longitudinal direction of the honeycomb substrate from the inflow-side end face to the outflow-side end face. That is, the end face located below is the outflow-side end face of the honeycomb substrate, whereby the range of disposing the trapping layer can be changed by adjusting the charging height of the slurry. After applying slurry to the honeycomb dried body, the honeycomb dried body may be dried.

(2-4) Second Plugging Step:

After the trapping layer forming slurry application step, open ends of the cells are plugged at the second plugging step for at least one of the inflow-side end face and the outflow-side end face of the honeycomb dried body. When the first plugging step is performed, the second plugging step is performed for the end face other than the end face filled with the plugging material at the first plugging step. When the trapping layer forming slurry application step is performed without performing the first plugging step, open ends of the cells are plugged for both of the inflow-side end face and the outflow-side end face of the honeycomb dried body. A method for filling with the plugging material can be performed in accordance with a conventionally known method for manufacturing a plugged honeycomb structure.

After filling the open ends of the cells with the plugging material, the honeycomb dried body may be dried again.

(2-5) Firing Step:

Next, the honeycomb dried body with the open ends of the cells filled with the plugging material is fired. The obtained honeycomb fired body is the plugged honeycomb structure of the present invention. The firing temperature is 1,350 to 1,430° C. preferably, 1,380 to 1,430° C. more preferably, and 1,400 to 1,430° C. particularly preferably. The firing duration is about 1 to 10 hours preferably. Firing may be performed in the air, in the water-vapor atmosphere, in the hydrocarbon gas combustion atmosphere, and the like. In the present specification, the firing temperature refers to the temperature of atmosphere for firing.

According to such a method for manufacturing a plugged honeycomb structure, the plugged honeycomb structure of the present invention can be manufactured easily. Note here that the method for manufacturing a plugged honeycomb structure can be changed as needed for the manufacturing step other than the "trapping layer forming slurry application step" as stated above based on the ordinary knowledge of a person skilled in the art as long as it includes the trapping layer forming slurry application step is performed to the honeycomb substrate before firing. For instance, a method for manufacturing a honeycomb formed body (forming step) and a method for filling with a plugging material (first plugging step and second plugging step) are not limited to the manufacturing steps as stated above. The order of these manufacturing steps also can be changed as needed based on the ordinary knowledge of a person skilled in the art as long as the trapping layer forming slurry application step is performed before the firing step.

EXAMPLES

The following describes the present invention in more details by way of examples, and the present invention is not limited to the following examples.

In the following Examples and Comparative Examples, six types of partition wall base material raw materials "a" to "1" shown in Table 1 were used as the partition wall base material raw material. Table 1 shows the preparation of the partition wall base material raw materials. The average particle diameter of powder included in these partition wall base material raw materials was measured using a laser diffraction/diffusion type particle diameter distribution analyzer ("Micro-track" (product name)" produced by Nikkiso Co., ltd.).

TABLE 1

|  |  | Partition wall base material raw material | | | | | |
|---|---|---|---|---|---|---|---|
|  |  | a | b | c | d | e | f |
| Cordierite powder | Particle diameter (μm) | 20 | 49 | 7 | 20 | 30 | — |
|  | Amount (g) | 5000 | 5000 | 5000 | 5000 | 5000 | — |
| Talc | Particle diameter (μm) | — | — | — | — | — | 3 |
|  | Amount (g) | — | — | — | — | — | 2099 |
| Alumina | Particle diameter (μm) | — | — | — | — | — | 21 |
|  | Amount (g) | — | — | — | — | — | 1688 |
| Silica | Particle diameter (μm) | — | — | — | — | — | 4 |
|  | Amount (g) | — | — | — | — | — | 1080 |
| Sintering aid | Type | — | — | — | $ZrO_2$ | $TiO_2$ | — |
|  | Particle diameter (μm) | — | — | — | 1 | 0.4 | — |
|  | Amount (g) | — | — | — | 100 | 65 | — |
| Pore former | Amount (g) | 300 | 25 | 1000 | 300 | 1000 | 25 |
| Montmorillonite | Amount (g) | 100 | 100 | 100 | 100 | 100 | 100 |
| Methylcellulose | Amount (g) | 500 | 500 | 500 | 500 | 500 | 300 |

In the following Examples and Comparative Examples, nine types of trapping layer forming slurry "A" to "I" shown in Table 2 were used as the trapping layer forming slurry. Table 2 shows the preparation of the trapping layer forming raw materials. The average particle diameter of powder included in these trapping layer forming slurry also was measured using a laser diffraction/diffusion type particle diameter distribution analyzer ("Micro-track" (product name)" produced by Nikkiso Co., ltd.).

Next, the obtained kneaded material was extruded to prepare a honeycomb formed body. The honeycomb formed body was such that the partition wall base material thereof after firing had the thickness of 300 μm, and the cell density of 46.5 cells/cm$^2$. The cells of the honeycomb found body was a square shape after firing, and the honeycomb formed body had a quadrangular pillar shape with square end faces. The length of one side of each end face of the quadrangular pillar shaped honeycomb formed body was 35 mm after firing.

TABLE 2

| | | Trapping layer forming slurry | | | | | | | | |
|---|---|---|---|---|---|---|---|---|---|---|
| | | A | B | C | D | E | F | G | H | I |
| Talc | Particle diameter (μm) | 3 | 3 | 3 | — | — | — | — | 13 | — |
| | Amount (g) | 43 | 43 | 34 | — | — | — | — | 44 | — |
| MgO | Particle diameter (μm) | — | — | — | 1 | 1 | 1 | 1 | — | — |
| | Amount (g) | — | — | — | 16 | 14 | 14 | 13 | — | — |
| Silica | Particle diameter (μm) | 4 | 8 | 8 | 8 | 8 | 4 | 0.5 | 8 | — |
| | Amount (g) | 23 | 23 | 19 | 59 | 52 | 52 | 47 | 22 | — |
| Alumina | Particle diameter (μm) | 2 | 2 | 2 | 2 | 0.5 | 0.5 | 0.5 | 0.5 | — |
| | Amount (g) | 34 | 34 | 27 | 41 | 35 | 36 | 32 | 34 | — |
| Cordierite powder | Particle diameter (μm) | — | — | — | — | — | — | — | — | 2 |
| | Amount (g) | — | — | — | — | — | — | — | — | 86 |
| Added amount of carbon black (g) | | 58 | 58 | 70 | 58 | 58 | 58 | 58 | 58 | 58 |
| Added amount of surfactant (g) | | 16 | 16 | 19 | 16 | 16 | 16 | 16 | 16 | 16 |
| Added amount of water (g) | | 195 | 195 | 195 | 195 | 195 | 195 | 259 | 195 | 195 |

Table 3 shows the types of the partition wall base material raw materials ("a" to "f") and the types of the trapping layer forming slurry ("A" to "I") used in the following Examples and Comparative Examples.

TABLE 3

| | Partition wall base material raw material | Trapping layer forming slurry |
|---|---|---|
| Ex. 1 | a | A |
| Ex. 2 | a | B |
| Ex. 3 | a | C |
| Ex. 4 | a | D |
| Ex. 5 | a | E |
| Ex. 6 | a | F |
| Ex. 7 | a | G |
| Ex. 8 | a | H |
| Ex. 9 | b | A |
| Ex. 10 | c | A |
| Ex. 11 | d | A |
| Ex. 12 | e | A |
| Ex. 13 | a | A |
| Comp. Ex. 1 | f | A |
| Comp. Ex. 2 | a | I |
| Comp. Ex. 3 | f | I |

Example 1

In Example 1, a partition wall base material forming raw material to prepare a honeycomb substrate was firstly prepared. The partition wall base material forming raw material was prepared by mixing 5,000 g of cordierite powder, 300 g of starch as pore former, 100 g of montmorillonite, and 500 g of methylcellulose to be powder (partition wall base material raw material "a"), to which appropriate amount of water was added. The cordierite powder had the average particle diameter of 20 μm, and the pore former had the average particle diameter of 25 μm.

Next, the obtained partition wall base material forming raw material was kneaded by a kneader, and then was pugged by a vacuum pugmill to form a kneaded material.

Next, the honeycomb formed body was dried to obtain a honeycomb dried body. Drying included microwave drying, followed by hot air drying at 120° C. for 2 hours. Next, the honeycomb dried body was cut so that the resultant after firing was 150 mm in length in the cell extending direction of the honeycomb dried body.

Next, open ends of predetermined cells of the obtained honeycomb dried body on the inflow-side end face were filled with a plugging material, followed by hot air drying again to form a plugging portion at the open ends of the predetermined cells on the inflow-side end face. As the plugging material, a raw material similar to that for the partition wall base material forming raw material was used other than that 10 g of methylcellulose was used, to which appropriate amount of water was added.

Next, trapping layer forming slurry was prepared. The trapping layer forming slurry was prepared by mixing 43 g of talc, 23 g of silica, and 34 g of alumina to be powder, to which 58 g of carbon black, 16 g of surfactant and 195 g of water were added. Talc had the average particle diameter of 3 μm, silica had the average particle diameter of 4 μm, and alumina had the average particle diameter of 2 μm. Carbon black used was "MA-100 (product name)" produced by Mitsubishi Chemical Corporation, and surfactant used was "Pegnol 005 (product name)" produced by Toho Chemical Industry Co., Ltd. Carbon black had the average particle diameter of 0.3 μm.

Next, the honeycomb dried body was placed at a jig so that the inflow-side end face with the plugging portion formed was located vertically above, and the aforementioned trapping layer forming slurry was poured into the honeycomb dried body from the outflow-side end face. After predetermined time has passed since the filling with the trapping layer forming slurry, the trapping layer forming slurry filled was discharged. Thereafter, the honeycomb dried body to which the trapping layer forming slurry was attached was hot-air dried at 40° C. In this way, a one-side plugged honeycomb dried body was obtained, in which the film of a trapping layer precursor as a dried trapping layer forming slurry was formed. Herein, the trapping layer precursor refers to a coating that turns a trapping layer after firing and prior to the stage to form the trapping layer.

Next, open ends of the residual cells of the obtained one-side plugged honeycomb dried body on the outflow-side end face were filled with the aforementioned plugging material, followed by hot air drying again to form a plugging portion at the open ends of the residual cells on the outflow-side end face, whereby a both-side plugged honeycomb dried body was obtained.

Next, the obtained both-side plugged honeycomb dried body was degreased. Degreasing was performed at 450° C. for 5 hours. Next, the degreased both-side plugged honeycomb dried body was fired to obtain a honeycomb fired body. Firing was performed in the air at 1,425° C. for 7 hours. Herein, the temperature rising from 1,200 to 1,425° C. during firing was performed in 5 hours. In this way, the plugged honeycomb structure of Example 1 was manufactured.

For the trapping layer making up the plugged honeycomb structure of Example 1, the pore surface area per unit volume ($\mu m^{-1}$), the porosity (%), the open frontal area (%), the average pore diameter ($\mu m$), the average thickness ($\mu m$), and the standard deviation of thickness ($\mu m$) were measured by the following method. Table 4 shows the results. In Table 4, the "pore surface area per unit volume ($\mu m^{-1}$)" was indicated as "pore surface area ($\mu m^{-1}$)". The "standard deviation of thickness ($\mu m$)" was indicated as "standard deviation ($\mu m$)". The measurement was performed as follows.

(Pore Surface Area Per Unit Volume ($\mu m^{-1}$) of Trapping Layer)

Firstly, a test piece was cut out from the partition wall of the plugged honeycomb structure, which was embedded in resin. Next, the test piece embedded in resin was cut in the direction perpendicular to the cell extending direction, and the cutting plane was ground. Next, an image of the ground cutting plane was taken using a scanning electron microscope to obtain a reflecting electron image at 1,000-fold magnification. This reflecting electron image was processed to measure the pore surface area per unit volume of the trapping layer. Specifically, the reflecting electron image was firstly binarized using "Image-Pro Plus 7.0" (product name) produced by Media Cybernetics Inc. as image processing software. Next, the outline of the substantive part of the trapping layer was extracted, and the length obtained by adding all of the lengths of the outline was set as the perimeter length. Next, the area of the substantive part of the trapping layer was measured. Then, the value obtained by dividing the perimeter length by the area of the substantive part of the trapping layer was used as the pore surface area per unit volume, whereby the pore surface area per unit volume of the trapping layer was obtained. In the reflecting electron image, the partition wall base material and the trapping layer were visually distinguished. Herein, the penetrating region that was judged that the trapping layer penetrated into the partition wall base material was not considered as the region of the trapping layer or the region of the partition wall base material, and the pore surface area per unit volume of the trapping layer and the partition wall base material was obtained for each of the regions other than the penetrating region.

(Porosity (%) of Trapping Layer)

The porosity of the trapping layer was measured as follows. Similarly to the method for measuring the pore surface area per unit volume of the trapping layer, a reflecting electron image at 500-fold magnification of the cutting plane cut out from the partition wall of the plugged honeycomb structure was taken using a scanning electron microscope. In the obtained image, the partition wall base material and the trapping layer were visually distinguished at the partition wall. Next, a binarized image was obtained using the aforementioned image processing software, whereby the porosity of the trapping layer was measured. Specifically, in the binarized image, the area of the substantive part of the trapping layer and the area of the pore part of the trapping layer were measured. Then, the ratio of the area of the pore part of the trapping layer with respect to the "sum of the area of the substantive part of the trapping layer and the area of the pore part of the trapping layer" was measured, which was used as the porosity. Herein, the penetrating region that was judged that the trapping layer penetrated into the partition wall base material was not considered as the region of the trapping layer or the region of the partition wall base material, and the porosity of the trapping layer was obtained for the region other than the penetrating region.

(Open Frontal Area of Trapping Layer (%))

The open frontal area of the trapping layer was measured as follows. The partition wall was is cut out from the plugged honeycomb structure. Next, an image of the surface of the trapping layer was taken using a scanning electron microscope, and the open frontal area of the trapping layer was measured using the aforementioned image processing software. Specifically, a reflecting electron image of the surface of the trapping layer of the partition wall cut out from the plugged honeycomb structure was taken at 500-fold magnification. Next, the obtained reflecting electron image was binarized using image processing software, followed by noise removal using a median filter. Next, using the image after noise removal, the area ratio of the pore part with respect to the "sum of the area of the pore part and the area of the substantive part of the trapping layer" was measured, which was used as the open frontal area of the trapping layer.

(Average Pore Diameter ($\mu m$) of Trapping Layer)

The average pore diameter of the trapping layer was measured as follows. Firstly, similar to the method for measuring the open frontal area of the trapping layer, an image after noise removal was obtained. In the obtained "image after noise removal", a distance map of the pore part was created, and the average of the maximum density in the distance map was measured, which was used as the average pore diameter.

For the plugged honeycomb structure of Example 1, the thickness ($\mu m$) of the part of the trapping layer penetrating into the pores formed at the partition wall base material and the pore surface area ratio that was a value obtained by dividing the pore surface area per unit volume of the trapping layer by the pore surface area per unit volume of the partition wall base material were measured. Table 4 shows the results. Hereinafter, the "thickness of the part of the trapping layer penetrating into the pores formed at the partition wall base material" may be called a "penetrating depth of the trapping layer" and the "value obtained by dividing the pore surface area per unit volume of the trapping layer by the pore surface area per unit volume of the partition wall base material" may be called a "pore surface area ratio".

The penetrating depth ($\mu m$) of the trapping layer and the pore surface area ratio were measured as follows. Firstly, a test piece was cut out from the partition wall of the plugged honeycomb structure, which was embedded in resin. Next, the test piece embedded in resin was cut in the direction perpendicular to the cell extending direction, and the cutting plane was ground. Next, an image of the ground cutting plane was taken using a scanning electron microscope to obtain a reflecting electron image at 1,000-fold magnification. This reflecting electron image was processed to measure the penetrating depth of the trapping layer. Specifically, the reflecting electron image was binarized using the aforementioned image processing software. In the binarized image, the thickness of the partition wall including the trapping layer and the partition wall base material was measured. Next, the outline of the substantive part of the partition wall was extracted. Next, the partition wall base material and the trapping layer were visually distinguished in the binarized image. Next, any one rectangular measurement region was selected in the visually identified partition wall base material part. The rectangular measurement region had a length of its sides such that a side parallel to the cell extending direction had a length of 100 µm, and a side parallel to the direction perpendicular to the cell extending direction had a length that was 50% or more of the thickness of the partition wall base material. Next, the length obtained by adding all of the lengths of the extracted outline in the aforementioned rectangular measurement region was set as the perimeter length. Next, the area of the substantive part of the partition wall base material was measured. Then, the value obtained by dividing the perimeter length by the area of the substantive part of the partition wall base material was set as the pore surface area per unit volume of the partition wall base material. Similarly, the pore surface area per unit volume of the trapping layer was obtained at the trapping layer part. Herein, the penetrating region that was judged that the trapping layer penetrated into the partition wall base material was not considered as the region of the trapping layer or the region of the partition wall base material, and the pore surface area per unit volume of the trapping layer and the partition wall base material was obtained for each of the regions other than the penetrating region. Next, in the binarized image, the partition wall was divided while setting the trapping layer surface as the reference (0 µm) so as to divide the partition wall into every 4 µm toward the partition wall base material, and the pore surface area per unit volume was measured for each of the divided regions. Next, using the value of the pore surface area per unit volume for each of the measured regions, the average pore surface area per unit volume was calculated for the region from the trapping layer surface to each region. Then, the relationship between the average pore surface area per unit volume in the range from the trapping layer surface (0 µm) to each region and the distance from the trapping layer surface was shown in the diagram as a graph. Next, comparison was made between the values of average pore surface area per unit volume in the range from the trapping layer surface to each region and the value of the pore surface area per unit volume of the trapping layer. In this comparison, the point was found where a difference between both of the values was the smallest and the value of the average pore surface area per unit volume in the range from one trapping layer surface to each region monotonously decreased toward the partition wall base material. Then, the distance from the trapping layer surface at this point was read from the graph, and the read value of the distance was used as the thickness of the trapping layer only. The thus obtained "thickness of the trapping layer only" was the thickness of the trapping layer that did not include the penetrating region. Similarly, the thickness of the partition wall base material only was obtained. That is, the relationship between the average pore surface area per unit volume in the range from the region including the partition wall center plane to each region and the distance from the trapping layer surface was shown in the diagram as a graph. Then, comparison was made between these plots and the pore surface area per unit volume of the partition wall base material as stated above, and the thickness of the partition wall base material only was found. Then, the value obtained by subtracting the sum of the thickness of the trapping layer only and the thickness of the partition wall base material only from the distance from the trapping layer surface to the center of the region including the partition wall center plane was the thickness of the part (penetrating region) of the trapping layer that penetrated into the pores of the partition wall base material. Then, the "value obtained by dividing the pore surface area per unit volume of the trapping layer by the pore surface area per unit volume of the partition wall base material" was used as the "pore surface area ratio".

Figure 10:
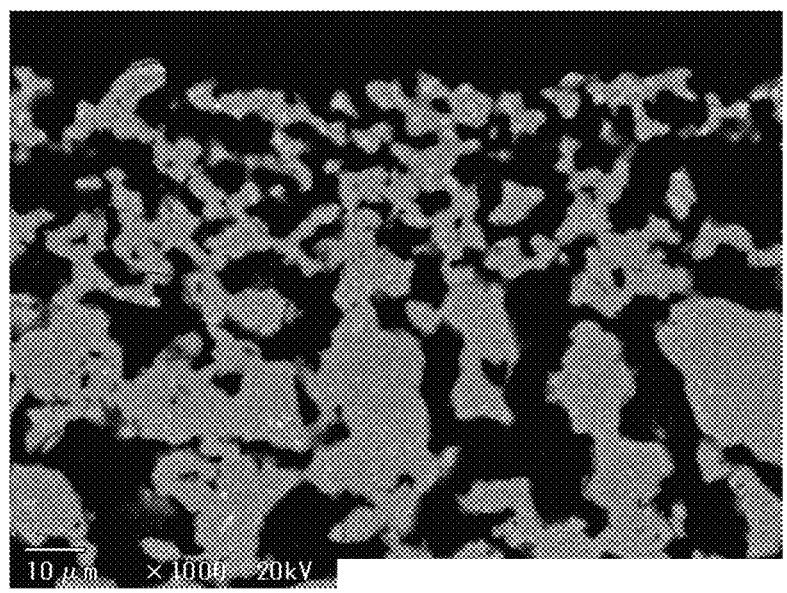
FIG. 10 is a photo taken of a reflecting electron image of the partition wall of the plugged honeycomb structure of Example 1 at 1,000-fold magnification using a scanning electron microscope.

Herein FIG. 10 is a photo taken of a reflecting electron image of the partition wall of the plugged honeycomb structure of Example 1 at 1,000-fold magnification using a scanning electron microscope. The upside of the sheet is the trapping layer side and the downside of the sheet is the partition wall base material side.

(Average Thickness (µm) of Trapping Layer and Standard Deviation (µm) of Thickness of Trapping Layer)

The average thickness of the trapping layer was measured as follows. A test piece was cut out from the partition wall of the plugged honeycomb structure, and was embedded in resin. Next, the test piece embedded in resin was cut in the direction perpendicular to the cell extending direction, and the cutting plane was ground. Next, an image of the ground cutting plane was taken using a scanning electron microscope to obtain a reflecting electron image at 500-fold magnification, which was then binarized using image processing software. Next, the average thickness and the standard deviation of the trapping layer were measured in the binarized image.

Firstly, the plugged honeycomb structure was divided equally into four test pieces in the direction perpendicular to the cell extending direction. Next, the four test pieces were embedded in resin, and the cutting planes were ground. Next, among six cross sections as a result of cutting at three points when the test piece was divided equally into four, three cross sections were selected, and the thickness of the trapping layer was measured. One cross section was selected for one cutting plane. Specifically, any one cell was selected from one cross section of the three cross sections as stated above. Then, the thickness of the trapping layer was measured for the partition walls defining any two sides among the partition walls defining the sides of the cell. Specifically, as shown in FIG. 8, the partition wall defining one side of the cell was divided equally into four regions virtually in the direction perpendicular to the one side. Next, an image of a part 31 (virtually divided part 31) where the four virtually divided regions were adjacent to each other was taken using a scanning electron microscope to obtain three reflecting electron images at 500-fold magnification. Next, each of the obtained reflecting electron images was binarized using the aforementioned image processing software. Then, in each of the binarized images, the trapping layer and the partition wall base material were visually distinguished, and the thickness of the trapping layer at each adjacent part 31 (virtually divided part 31) as stated above was measured. Similar measurement was performed for the partition wall 10 defining other sides of the cell as well. Next, the thickness of the trapping layer was measured as stated above for the residual two cross sections as well. Then, the average of the obtained thicknesses of the trapping layer at 18 places was used as the average thickness of the trapping layer. Then, the standard deviation of the thus obtained thicknesses of the trapping layer at 18 places was used as the standard deviation of the thickness of the trapping layer.

For the partition wall base material of the honeycomb substrate making up the plugged honeycomb structure of Example 1, the pore surface area per unit volume ($\mu m^{-1}$), the porosity (%), the average in-plane uniformity index γ, and the average pore diameter (μm) were measured. Table 4 shows the results. The measurement was performed as follows.

(Pore Surface Area Per Unit Volume ($\mu m^{-1}$) of Partition Wall Base Material)

This was obtained similarly to the measurement of the penetrating depth (μm) of the trapping layer and the pore surface area ratio.

(Porosity (%) of Partition Wall Base Material)

This was obtained similarly to the measurement of the porosity (%) of the trapping layer.

(Average in-Plane Uniformity Index γ of Partition Wall Base Material)

The average in-plane uniformity index γ of the partition wall base material was measured in accordance with the method described JP-5426803-B. Specifically, the plugged honeycomb structure was divided into halves in the cell extending direction. Then, a test piece of 5 mm×5 mm×5 mm was cut out from any one of the two halves of the plugged honeycomb structure as follows. Herein, one plane of the test piece was the face appearing when the plugged honeycomb structure was divided into halves. A partition wall base material part of the obtained test piece was 3-dimensional scanned (CT scanned) to obtain pixel data. Then, porous body data was acquired from the obtained pixel data, in which position information representing the position of a pixel and pixel type information representing whether the pixel was a space pixel representing space or an object pixel representing an object were correlated. Next, a piece of image data of a predetermined solid body was extracted from the obtained pixel data, and analysis processing routine was carried out. The image data of the solid body to which the analysis processing routine was carried out was 96 μm (=1.2 μm×80 pixels) in the X direction, 480 μm (=1.2 μm×400 pixels) in the Y direction, and 480 μm (=1.2 μm×400 pixels) in the Z direction. Herein, the X direction was the thickness direction of the partition wall, and the Y direction and the Z direction were orthogonal to the X direction and the Y direction and the Z direction were orthogonal. In the analysis processing routine, fluid analysis was performed for a pore part of the image, and the values of n, x, $u_i$, $u_{mean}$, $A_i$, and A were obtained, which were necessary to calculate the in-plane uniformity index $γ_x$ from the aforementioned expression (1). Then, the in-plane uniformity index $γ_x$ was derived for 80 (=96 μm/1.2 μm) cross sections where the distance x was changed for every 1.2 μm. Then, the average of the 80 in-plane uniformity indexes $γ_x$ was used as the average in-plane uniformity index γ of the partition wall base material.

(Average Pore Diameter (μm) of Partition Wall Base Material)

The average pore diameter of the partition wall base material was measured in accordance with the method described JP-5426803-B. Specifically a test piece was obtained from the partition wall of the plugged honeycomb structure similarly to the method for measuring the average in-plane uniformity index γ of the partition wall base material. A partition wall base material part of the obtained test piece was 3-dimensional scanned (CT scanned) to obtain pixel data. Next, a piece of image data of a predetermined solid body was extracted from the obtained one piece of pixel data, and analysis processing routine was carried out. The image data of the solid body to which the analysis processing routine was carried out is 96 μm (=1.2 μm×80 pixels) in the X direction, 400 μm (=1.2 μm×480 pixels) in the Y direction, and 400 μm (=1.2 μm×480 pixels) in the Z direction. Herein, the X direction was the thickness direction of the partition wall, and the Y direction and the Z direction were orthogonal to the X direction and the Y direction and the Z direction were orthogonal. In the analysis processing routine, a virtual curved surface solid was placed at a pore part of the image, and its equivalent diameter and difference pore volume were obtained. Then, a log differential pore volume that was of base 10 logarithm was obtained by dividing the difference pore volume by a difference value of a logarithm of the equivalent diameter. The log differential pore volume that is of base 10 logarithm represents the volume ratio (cc/cc) of the virtual curved surface solid accounting for in the volume of the space pixel. Then the median of the equivalent diameter was obtained from the distribution of the volume ratio (cc/cc) of the virtual curved surface solid accounting for in the volume of the space pixel having all of the obtained equivalent diameters as the population, and this median of the equivalent diameter was used as the average pore diameter of the partition wall base material.

Figure 9:
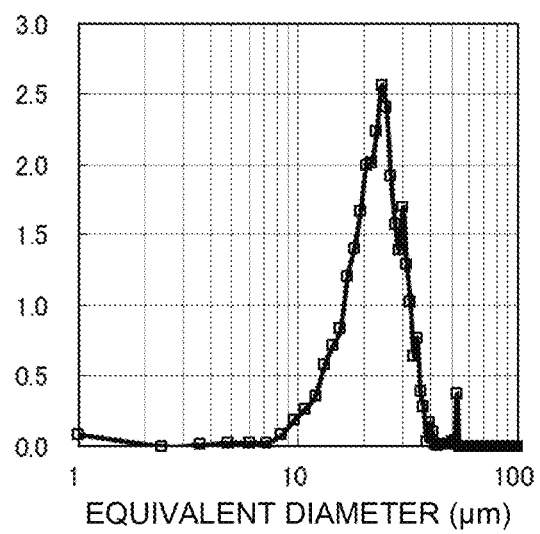
FIG. 9 is a graph representing the relationship between the equivalent diameter (μm) of the virtual curved surface solid and the volume ratio (cc/cc) of the virtual curved surface solid accounting for in the volume of the space pixel that were obtained when the average pore diameter of the partition wall base material in the plugged honeycomb structure of Example 1 was measured.

Herein FIG. 9 is a graph representing the relationship between the equivalent diameter (μm) of the virtual curved surface solid and the volume ratio (cc/cc) of the virtual curved surface solid accounting for in the volume of the space pixel that were obtained when the average pore diameter of the partition wall base material in the plugged honeycomb structure of Example 1 was measured. Herein, the "equivalent diameter (μm)" in FIG. 9 represents the "equivalent diameter (μm) of the virtual curved surface solid".

TABLE 4

| | Trapping layer part | | | | | Penetrating | | Partition wall base material part | | | |
|---|---|---|---|---|---|---|---|---|---|---|---|
| | Pore surface area ($\mu m^{-1}$) | Porosity (%) | Open frontal area (%) | Average pore diameter (μm) | Average thickness (μm) | Standard deviation (μm) | depth of trapping layer (μm) | Pore surface area ratio | Pore surface area ($\mu m^{-1}$) | Porosity (%) | Average in-plane uniformity index γ | Average pore diameter (μm) |
| Ex. 1 | 0.19 | 54 | 25 | 2.5 | 28 | 5 | 0 | 5.3 | 0.04 | 43 | 0.73 | 23 |
| Ex. 2 | 0.18 | 58 | 27 | 2.7 | 25 | 5 | 4 | 5.0 | 0.04 | 43 | 0.73 | 23 |
| Ex. 3 | 0.16 | 61 | 30 | 2.7 | 35 | 10 | 0 | 4.6 | 0.04 | 43 | 0.73 | 23 |
| Ex. 4 | 0.08 | 68 | 34 | 2.7 | 27 | 4 | 0 | 2.2 | 0.04 | 43 | 0.73 | 23 |
| Ex. 5 | 0.13 | 59 | 28 | 2.5 | 25 | 7 | 0 | 3.6 | 0.04 | 43 | 0.73 | 23 |
| Ex. 6 | 0.19 | 49 | 21 | 2.2 | 37 | 6 | 8 | 5.3 | 0.04 | 43 | 0.73 | 23 |

TABLE 4-continued

| | Trapping layer part | | | | | Penetrating depth of trapping layer (μm) | Pore surface area ratio | Partition wall base material part | | | |
|---|---|---|---|---|---|---|---|---|---|---|---|
| | Pore surface area (μm⁻¹) | Porosity (%) | Open frontal area (%) | Average pore diameter (μm) | Average thickness (μm) | Standard deviation (μm) | | | Pore surface area (μm⁻¹) | Porosity (%) | Average in-plane uniformity index γ | Average pore diameter (μm) |
| Ex. 7 | 0.22 | 43 | 17 | 1.9 | 13 | 3 | 8 | 6.0 | 0.04 | 43 | 0.73 | 23 |
| Ex. 8 | 0.17 | 61 | 29 | 2.9 | 23 | 4 | 0 | 4.8 | 0.04 | 43 | 0.73 | 23 |
| Ex. 9 | 0.19 | 54 | 25 | 2.5 | 34 | 8 | 12 | 5.8 | 0.03 | 37 | 0.74 | 21 |
| Ex. 10 | 0.19 | 54 | 25 | 2.5 | 23 | 4 | 0 | 6.0 | 0.03 | 48 | 0.78 | 27 |
| Ex. 11 | 0.19 | 54 | 25 | 2.5 | 28 | 5 | 0 | 14.6 | 0.01 | 33 | 0.71 | 28 |
| Ex. 12 | 0.19 | 54 | 25 | 2.5 | 31 | 7 | 4 | 11.9 | 0.02 | 43 | 0.76 | 32 |
| Ex. 13 | 0.11 | 57 | 26 | 2.3 | 29 | 5 | 0 | 3.1 | 0.04 | 43 | 0.73 | 23 |
| Comp. Ex. 1 | less than 0.01 | | | | densified | | | | 0.01 | 33 | 0.53 | 42 |
| Comp. Ex. 2 | less than 0.01 | | | | densified | | | | 0.04 | 43 | 0.73 | 23 |
| Comp. Ex. 3 | 0.15 | 53 | 23 | 1.4 | 27 | 19 | 32 | 17.3 | 0.01 | 33 | 0.53 | 42 |

Examples 2 to 12

In Examples 2 to 12, plugged honeycomb structures were manufactured similarly to Example 1 other than that the partition wall base material raw materials and the trapping layer forming slurry as shown in Table 3 were used.

Example 13

In Example 13, a plugged honeycomb structure was manufactured similarly to Example 1 other than the partition wall base material raw material and the trapping layer forming slurry as shown in Table 3 were used and the firing condition was changed. In Example 13, the temperature rising from 1,200 to 1,425° C. during firing of the plugged honeycomb structure after degreasing was performed in 23 hours.

Comparative Examples 1 and 2

In Comparative Examples 1 and 2, plugged honeycomb structures were manufactured similarly to Example 1 other than that the partition wall base material raw material and the trapping layer forming slurry were used as shown in Table 3.

Comparative Example 3

In Comparative Example 3, firstly, a plugged honeycomb structure was manufactured similarly to Example 1 other than that the partition wall base material raw material shown in Table 3 was used and the plugged honeycomb structure was fired without applying a trapping layer forming slurry. Next, the trapping layer forming slurry shown in Table 3 was poured into the cells of the obtained plugged honeycomb structure from the inflow-side end face. Next, excess slurry was discharged, followed by hot-air drying at 120° C. and firing again, whereby the plugged honeycomb structure of Comparative Example 3 was manufactured. The firing condition during firing again was in the air at 1,300° C. for 2 hours.

For the trapping layers of the plugged honeycomb structures of Examples 2 to 8 and Comparative Examples 1 to 3, the pore surface area per unit volume (μm⁻¹), the porosity (%), the open frontal area (%), and the average pore diameter (μm) were measured by the method similar to Example 1. For the plugged honeycomb structures of Examples 2 to 8 and Comparative Examples 1 to 3, the penetrating depth (μm) of the trapping layer and the pore surface area ratio also were measured by the method similar to Example 1. Then, for the partition wall base materials of the honeycomb substrates making up the plugged honeycomb structures of Examples 2 to 8 and Comparative Examples 1 to 3, the pore surface area per unit volume (μm⁻¹), the porosity (%), the average in-plane uniformity index γ, and the average pore diameter (μm) were measured. Table 4 shows the results. Herein in Comparative Examples 1 and 2, the pore surface area per unit volume of the trapping layer was less than 0.01 μm⁻¹, and no porous trapping layer was formed at the surface of the partition wall base material. That is, in Comparative Examples 1 and 2, a compact trapping layer was formed at the surface of the partition wall base material. Therefore for Comparative Examples 1 and 2, measurement of the pore surface area per unit volume (μm⁻¹), the porosity (%), the open frontal area (%), the average pore diameter (μm), the penetrating depth (μm) of the trapping layer and the pore surface area ratio was not performed, and they are shown as "compact" in their corresponding fields of Table 4.
(Results)

Since the plugged honeycomb structure of Example 1 included cordierite powder as the partition wall base material raw material and a cordierite forming raw material as the trapping layer forming slurry, the plugged honeycomb structure manufactured had a trapping layer, in which the thickness of the part thereof penetrating into the pores formed at the partition wall base material was 0 μm.

The plugged honeycomb structure of Example 2 had a large average particle diameter of silica included in the trapping layer forming slurry as compared with the plugged honeycomb structure of Example 1. As a result, the plugged honeycomb structure of Example 2 had high porosity of the trapping layer and large average pore diameter of the trapping layer as compared with the plugged honeycomb structure of Example 1.

The plugged honeycomb structure of Example 3 had large mass of carbon black included in the trapping layer forming slurry as compared with the plugged honeycomb structure of Example 2. As a result, the plugged honeycomb structure of Example 3 had high porosity of the trapping layer as compared with the plugged honeycomb structure of Example 2.

The plugged honeycomb structure of Example 4 was manufactured so that the trapping layer forming slurry included MgO. As a result, the plugged honeycomb structure of Example 4 had high porosity of the trapping layer as compared with the plugged honeycomb structure of Example 2, in which the trapping layer forming slurry included talc.

The plugged honeycomb structure of Example 5 had a small average particle diameter of alumina included in the trapping layer forming slurry as compared with the plugged honeycomb structure of Example 4. As a result, the plugged honeycomb structure of Example 5 had low porosity of the trapping layer and a small average pore diameter of the trapping layer as compared with the plugged honeycomb structure of Example 4.

The plugged honeycomb structure of Example 6 had a small average particle diameter of silica included in the trapping layer forming slurry as compared with the plugged honeycomb structure of Example 5. As a result, the plugged honeycomb structure of Example 6 had low porosity of the trapping layer and a small average pore diameter of the trapping layer as compared with the plugged honeycomb structure of Example 5.

The plugged honeycomb structure of Example 7 had a small average particle diameter of silica included in the trapping layer forming slurry as compared with the plugged honeycomb structure of Example 6. As a result, the plugged honeycomb structure of Example 7 had low porosity of the trapping layer and a small average pore diameter of the trapping layer as compared with the plugged honeycomb structure of Example 6.

The plugged honeycomb structure of Example 8 was manufactured so that the trapping layer forming slurry included talc. As a result, the plugged honeycomb structure of Example 8 had high porosity of the trapping layer and a large average pore diameter of the trapping layer as compared with the plugged honeycomb structure of Example 5.

For the plugged honeycomb structure of Example 9, a partition wall base material raw material different form that of the plugged honeycomb structure of Example 1 was used as shown in Table 3. As a result, the plugged honeycomb structure of Example 9 had low porosity of the partition wall base material and a small average pore diameter of the partition wall base material as compared with the plugged honeycomb structure of Example 1.

For the plugged honeycomb structure of Example 10, a partition wall base material raw material different form that of the plugged honeycomb structure of Example 1 was used as shown in Table 3. As a result, the plugged honeycomb structure of Example 10 had high porosity of the partition wall base material and a large average pore diameter of the partition wall base material as compared with the plugged honeycomb structure of Example 1.

For the plugged honeycomb structure of Example 11, a partition wall base material raw material different form that of the plugged honeycomb structure of Example 1 was used as shown in Table 3. As a result, the plugged honeycomb structure of Example 11 had low porosity of the partition wall base material and a large average pore diameter of the partition wall base material as compared with the plugged honeycomb structure of Example 1.

For the plugged honeycomb structure of Example 12, a partition wall base material raw material different form that of the plugged honeycomb structure of Example 1 was used as shown in Table 3. As a result, the plugged honeycomb structure of Example 12 had a large average pore diameter of the partition wall base material as compared with the plugged honeycomb structure of Example 1.

The plugged honeycomb structure of Example 13 was manufactured through the firing step where the temperature-rising time from 1,200 to 1,425° C. was longer than that for the plugged honeycomb structure of Example 1. As a result, the plugged honeycomb structure of Example 13 had high porosity of the trapping layer and a small average pore diameter of the trapping layer as compared with the plugged honeycomb structure of Example 1.

For the plugged honeycomb structure of Comparative Example 1, each of the partition wall base material raw material and the trapping layer forming slurry included a cordierite forming raw material. For the plugged honeycomb structure of Comparative Example 2, each of the partition wall base material raw material and the trapping layer forming slurry included cordierite powder. As a result, in the plugged honeycomb structures of Comparative Examples 1 and 2, a porous trapping layer was not formed, and a dense trapping layer (compact trapping layer) was formed at the surface of the partition wall base material.

In the plugged honeycomb structure of Comparative Example 3, the plugged honeycomb structure was fired without applying a trapping layer forming slurry, and then a trapping layer forming slurry was applied to the fired plugged honeycomb structure, followed by firing again, whereby a trapping layer was formed at the plugged honeycomb structure. As a result, in the plugged honeycomb structure of Comparative Example 3, the penetrating depth of the trapping layer was 32 μm (exceeding 20 μm).

In the plugged honeycomb structures of Examples 1 to 13, a porous trapping layer including cordierite as a main phase was formed at the surface of the partition wall base material including cordierite as a main phase, and the thickness of the part of the trapping layer penetrating into the pores formed at the partition wall base material was 0 to 20 μm. Therefore, when the plugged honeycomb structures of Example 1 to 13 were used as a honeycomb filter, they were expected to have low initial pressure loss as well as small increase in pressure loss during deposition of particulate matter. On the contrary, since the plugged honeycomb structures of Comparative Examples 1 and 2 had no porous trapping layer formed but had dense trapping layer formed therein, they were expected to have high initial pressure loss as well as large increase in pressure loss during deposition of particulate matter. In the plugged honeycomb structure of Comparative Example 3, the part of the trapping layer penetrating into the pores formed at the partition wall base material had a thickness of 32 μm. Therefore, when the plugged honeycomb structure of Comparative Example 3 was used as a filter, it was expected to have high initial pressure loss.

The plugged honeycomb structure of the present invention is available as an exhaust-gas purification filter to purify exhaust gas.

DESCRIPTION OF REFERENCE NUMERALS

1: partition wall base material
2: cell
2a: cell (residual cell)
2b: cell (predetermined cell)
3: circumferential wall
4: honeycomb substrate
5: plugging portion
6: trapping layer
10: partition wall
11: inflow-side end face
12: outflow-side end face
31: part G: fluid flowing through cells
C1, C2: corner
100: plugged honeycomb structure

What is claimed is:

1. A plugged honeycomb structure, comprising:
a pillar-shaped honeycomb substrate having a partition wall base material that defines a plurality of cells serving as a through channel of fluid;
a plugging portion disposed at open ends of predetermined cells at an inflow-side end face of fluid and at open ends of residual cells at an outflow-side end face of fluid; and
a porous trapping layer disposed at least at a part of a surface of the partition wall base material, wherein
the partition wall base material is formed by a base material porous body including cordierite as a main phase,
the trapping layer is formed by a trapping layer porous body including cordierite as a main phase,
the trapping layer is disposed at least at a surface of the partition wall base material of the residual cells,
a part of the trapping layer penetrating into pores formed at the partition wall base material has a thickness of 0 to 20 μm,
the partition wall base material has an average in-plane uniformity index γ of 0.7 or more, and
wherein the trapping layer is formed by applying a slurry of cordierite forming raw material to the partition wall base material before firing the pillar-shaped honeycomb substrate.

2. The plugged honeycomb structure according to claim 1, wherein the partition wall base material has a thickness of 100 to 500 μm.

3. The plugged honeycomb structure according to claim 1, wherein the partition wall base material has porosity of 30 to 50%.

4. The plugged honeycomb structure according to claim 1, wherein the partition wall base material has an average pore diameter of 10 to 40 μm.

5. The plugged honeycomb structure according to claim 1, wherein the base material porous body forming the partition wall base material includes, as sintering aid, at least one type selected from the group consisting of $ZrO_2$, $TiO_2$, $CeO_2$, and $Y_2O_3$.

6. The plugged honeycomb structure according to claim 5, wherein the base material porous body forming the partition wall base material includes 1 to 5 parts by mass of the sintering aid with respect to total mass of MgO, $Al_2O_3$, and $SiO_2$ that is 100 parts by mass.

7. The plugged honeycomb structure according to claim 1, wherein the trapping layer has a pore surface area per unit volume that is twice or more of a pore surface area per unit volume of the partition wall base material.

8. The plugged honeycomb structure according to claim 1, wherein the trapping layer has a pore surface area per unit volume that is 0.05 to 0.3 $μm^{-1}$.

9. The plugged honeycomb structure according to claim 1, wherein the trapping layer has porosity of 40 to 80%.

10. The plugged honeycomb structure according to claim 1, wherein the trapping layer has an average pore diameter of 1 to 3 μm.

11. The plugged honeycomb structure according to claim 1, wherein the trapping layer has an average thickness of 10 to 50 μm.

12. The plugged honeycomb structure according to claim 1, wherein the trapping layer has standard deviation of thickness that is 10 μm or less.

* * * * *